US012235639B1

(12) United States Patent
Downey et al.

(10) Patent No.: US 12,235,639 B1
(45) Date of Patent: Feb. 25, 2025

(54) UNMANNED AERIAL VEHICLE FLIGHT CONTROL SYSTEM

(71) Applicant: Skydio, Inc., Redwood, CA (US)

(72) Inventors: Jonathan Downey, San Francisco, CA (US); Mark Patrick Bauer, San Francisco, CA (US); Edward Dale Steakley, Cupertino, CA (US); Brian Richman, San Francisco, CA (US); Bernard J. Michini, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 997 days.

(21) Appl. No.: 15/891,736

(22) Filed: Feb. 8, 2018

Related U.S. Application Data

(60) Provisional application No. 62/509,626, filed on May 22, 2017, provisional application No. 62/501,341, filed on May 4, 2017, provisional application No. 62/456,586, filed on Feb. 8, 2017.

(51) Int. Cl.
| | |
|---|---|
| *G05D 1/00* | (2006.01) |
| *B64C 39/02* | (2023.01) |
| *B64U 50/19* | (2023.01) |
| *B64U 50/34* | (2023.01) |
| *B64U 101/30* | (2023.01) |

(52) U.S. Cl.
CPC .......... *G05D 1/0011* (2013.01); *B64C 39/024* (2013.01); *B64U 50/19* (2023.01); *B64U 50/34* (2023.01); *B64U 2101/30* (2023.01); *B64U 2201/202* (2023.01)

(58) Field of Classification Search
CPC ................ G05D 1/0011; B64C 39/024; B64C 2201/066; B64C 2201/123; B64C 2201/148; B64C 2201/042; B64U 50/19; B64U 50/34; B64U 2101/30; B64U 2201/202
USPC ............................................................ 701/2
See application file for complete search history.

(56) References Cited

U.S. PATENT DOCUMENTS

| | | | |
|---|---|---|---|
| 9,501,060 B1 * | 11/2016 | Zhang .................... | B64C 39/024 |
| 9,508,263 B1 * | 11/2016 | Teng ..................... | G05D 1/0094 |
| 9,613,538 B1 * | 4/2017 | Poole ................... | G06F 3/04815 |
| 9,678,507 B1 * | 6/2017 | Douglas ................ | G08G 5/0013 |
| 9,704,408 B2 * | 7/2017 | Yu ......................... | B64D 47/08 |

(Continued)

FOREIGN PATENT DOCUMENTS

| | | | | |
|---|---|---|---|---|
| CN | 105517666 | * | 4/2016 | |
| CN | 105517666 A | * | 4/2016 | ............. B64C 19/00 |

(Continued)

*Primary Examiner* — Muhammad Shafi

(57) ABSTRACT

Methods, systems and apparatus, including computer programs encoded on computer storage media for unmanned aerial vehicle flight for performing an inspection of land, property, structures or other objects. Automated aerial surveys allow a UAV to obtain aerial data without human manual control of a UAV. For certain aerial surveys, a UAV is not capable of completing the survey without refueling, or exchanging out used batteries for fresh batteries. For such aerial surveys, a method and system is needed to allow an operator to automatically perform an aerial survey while determining battery usage and replacement. Also, in circumstances where manual control of the UAV is needed, contingency-based software controls may be needed.

29 Claims, 19 Drawing Sheets

(56) References Cited

U.S. PATENT DOCUMENTS

| | | | | |
|---|---|---|---|---|
| 9,764,836 | B1* | 9/2017 | Elzinga | B64C 39/024 |
| 9,798,329 | B2* | 10/2017 | Shattil | H04B 7/18504 |
| 9,805,372 | B2* | 10/2017 | Gong | G06F 16/29 |
| 9,841,761 | B2* | 12/2017 | Shehata | H04N 7/181 |
| 2014/0163772 | A1* | 6/2014 | Vian | G05D 1/0202 |
| | | | | 701/2 |
| 2016/0307447 | A1* | 10/2016 | Johnson | B60L 58/12 |
| 2017/0010611 | A1* | 1/2017 | Tao | G09B 19/165 |
| 2017/0129603 | A1* | 5/2017 | Raptopoulos | B64C 39/024 |
| 2017/0177006 | A1* | 6/2017 | Fisher | B60L 53/51 |
| 2017/0206648 | A1* | 7/2017 | Marra | B64C 39/024 |
| 2017/0334559 | A1* | 11/2017 | Bouffard | G08G 5/0082 |

FOREIGN PATENT DOCUMENTS

| | | | | |
|---|---|---|---|---|
| WO | WO-2013163746 | * | 11/2013 | |
| WO | WO-2013163746 A1 | * | 11/2013 | B64C 39/024 |

\* cited by examiner

UNMANNED AERIAL VEHICLE FLIGHT CONTROL SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned Aerial Vehicles (UAVs) can be navigated about geographic areas to obtain aerial images of structures, such as rooftops of houses or commercial buildings, and so on. Automated aerial surveys allow a UAV to obtain aerial data without human manual control of a UAV. For certain aerial surveys, a UAV is not capable of completing the survey without refueling, or exchanging out used batteries for fresh batteries. For such aerial surveys, a method and system is needed to allow an operator to automatically perform an aerial survey while determining battery usage and replacement. Also, in circumstances where manual control of the UAV is needed, contingency-based software controls are needed.

SUMMARY

Particular embodiments of the subject matter described in this specification can be implemented so as to realize one or more of the following advantages.

In general, one innovative aspect of the subject matter described in this specification can be embodied in a system, computer readable media and methods that include a flight system for navigating an unmanned aerial vehicle to perform an aerial inspection of a structure, property, land or other object.

A ground control station or user device receives one or more jobs that have been assigned to the particular operator. The jobs include information of the location where a job is to be performed. The job may include an area designated to be surveyed, and a geofence identifying a boundary to limit flight of a UAV. The survey area and/or the geofence boundary may be modified to adjust the size of the survey area or geofence. A home location for the UAV is set. The number of batteries for the total flight time, and numbers of legs are determined. Then the UAV is confirmed ready to fly after pre-flight checks have been completed. The flight inspection is commenced, and the system instructs to UAV to fly to a starting location. The UAV performs a flight pattern, and obtains aerial sensor information describing a property, land, or other structure. The system monitors the battery life remaining, and will automatically instruct the UAV to return to the home location once the battery has reached a threshold remaining charge. Upon returning to the home location, an operator is instructed to insert another battery, and after confirm flight checks again, the UAV returns to the location where the UAV stopped obtaining sensor data. The location of the battery swaps occurred may be presented in the user interface. Optionally, the UAV inspection may be interrupted and the UAV returning to the home location, and later the survey may be resumed.

In different embodiments, there are user interfaces for a ground control system to navigate a UAV to inspect a structure. In one embodiment, system displays a user interface that includes a first graphical control to maneuver an unmanned aerial vehicle (UAV) in a horizontal direction, and a second graphical control to maneuver the UAV in a vertical direction. The user interface displays digital imagery obtain by the UAV, such as digital still images or video images. The user interface receives on or more inputs manipulating or operation the first and second graphical controls. The first graphical control is moveable over the displayed digital images, and indicates a position over the displayed area where the UAV should navigate. In response to the movement of the first graphical control, the system instructs the UAV to move in a horizontal direction. In response to the movement of the second graphical control, the system instructs the UAV to move in a vertical direction. The system may receive commands to instruct the UAV to obtain sensor data describing an inspection area.

DETAILED DESCRIPTION

This specification describes a ground control station or user device for performing a flight plan or pattern of a UAV to obtain aerial images, or other sensor information describing an area of land, property, or of a structure. Various methods or systems may be used to create a flight plan or pattern. Examples of describing a flight plan are included in U.S. patent application Ser. No. 15/042,798 titled "UNMANNED AERIAL VEHICLE REMOTE FLIGHT PLANNING SYSTEM," which is hereby incorporated by reference in its entirety for all purposes.

As will be described, a ground control station or user device receives one or more jobs that have been assigned to a particular operator. The jobs include information of the location where a job is to be performed. The job may include an area designated to be surveyed, and a geofence identifying a boundary to limit flight of a UAV. The survey area and/or the geofence boundary may be modified to adjust the size of the survey area or geofence. A home location for the UAV is set. The number of batteries for the total flight time, and numbers of legs are determined. Then the UAV is confirmed ready to fly after pre-flight checks have been completed. The flight inspection is commenced, and the system instructs to UAV to fly to a starting location. The UAV performs a flight pattern, and obtains aerial sensor information describing a property, land, or other structure. The system monitors the battery life remaining, and will automatically instruct the UAV to return to the home location once the battery has reached a threshold remaining charge. Upon returning to the home location, an operator is instructed to insert another battery, and after confirm flight checks again, the UAV returns to the location where the UAV stopped obtaining sensor data. The location of the battery swaps occurred may be presented in the user interface. Optionally, the UAV inspection may be interrupted and the UAV returning to the home location, and later the survey may be resumed.

In certain situations one or more pop-up soft controls are displayed over user interface allowing an operator to take manual control of the UAV in certain situations.

In this specification unmanned aerial vehicles include drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

Figure 1:
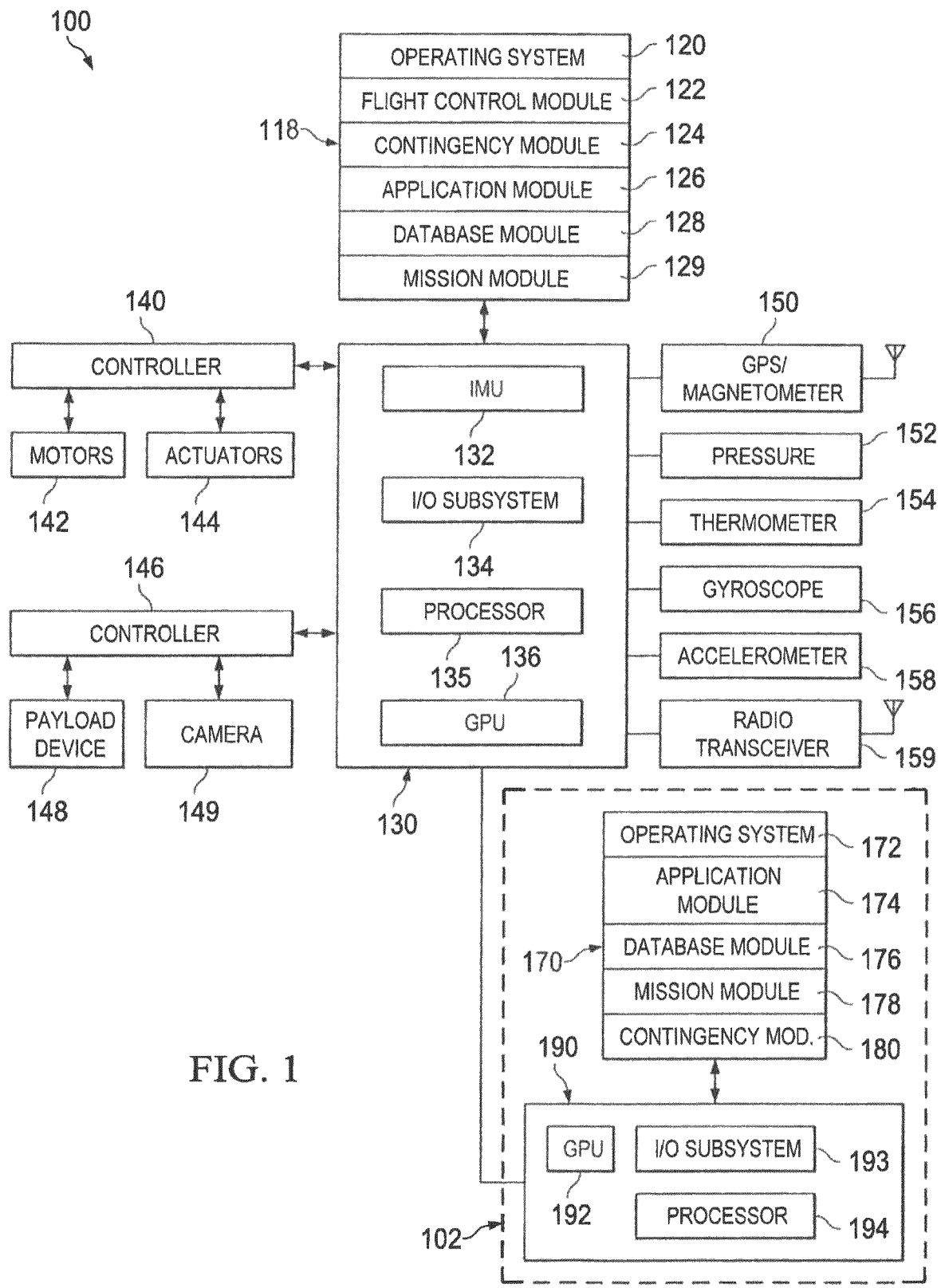
FIG. 1 is a block diagram of an example flight control system architecture for an unmanned aerial vehicle (UAV).

FIG. 1 is a block diagram of an example Unmanned Aerial Vehicle (UAV) architecture for implementing the features and processes described herein. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including one or more processors 135, graphics processing units 136, I/O subsystem 134, and an inertial measurement unit (IMU) 132. In addition, the UAV primary computer system 100 can include logic circuits, analog circuits, associated volatile and/or non-volatile memory, associated input/output data ports, power ports, etc., and include one or more software processes executing on one or more processors or computers. The UAV primary computer system 100 can include memory 118. Memory 118 may include non-volatile memory, such as one or more magnetic disk storage devices, solid-state hard drives, or flash memory. Other volatile memory such a RAM, DRAM, SRAM may be used for temporary storage of data while the UAV is operational. Databases may store information describing UAV flight operations, flight plans, contingency events, geofence information, component information and other information.

The UAV primary computer system 100 may be coupled to one or more sensors, such as GNSS receivers 150 (e.g., GPS receivers), thermometer 154, gyroscopes 156, accelerometers 158, pressure sensors (static or differential) 152, current sensors, voltage sensors, magnetometers, hydrometers, and motor sensors. The UAV may use IMU 132 in inertial navigation of the UAV. Sensors can be coupled to the UAV primary computer system 100, or to controller boards coupled to the UAV primary computer system 100. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 100 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear and parachute deployment.

The contingency module 124 monitors and handles contingency events. For example, the contingency module 124 may detect that the UAV has crossed a boundary of a geofence, and then instruct the flight control module 122 to return to a predetermined landing location. The contingency module 124 may detect that the UAV has flown or is flying out of a visual line of sight (VLOS) from a ground operator, and instruct the flight control module 122 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module may send information concerning the flight plan to the flight control module 122, for example waypoints (e.g., latitude, longitude and altitude), flight velocity, so that the flight control module 122 can autopilot the UAV.

The UAV may have various devices connected to the UAV for performing a variety of tasks, such as data collection. For example, the UAV may carry a camera 149, which can be, for example, a still image camera, a video camera, an infrared camera, or a multispectral camera. In addition, the UAV may carry a Lidar, radio transceiver, sonar, and traffic collision avoidance system (TCAS). Data collected by the devices may be stored on the device collecting the data, or the data may be stored on non-volatile memory 118 of the UAV primary computer system 100.

The UAV primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), cloud system, or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

Flight data logs may be generated by reading various information from the UAV sensors and operating system 120 and storing the information in computer-readable media (e.g., non-volatile memory 118). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. This foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 120. In some implementations, the operating system 120 can be a real-time operating system (RTOS), UNIX, LINUX, OS X, WINDOWS, ANDROID, or another operating system 120. Additionally, other software modules and applications may run on the operating system 120, such as a flight control module 122, contingency module 124, application module 126, database module 128 and mission module 129. Typically, flight critical functions will be performed using the UAV primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPU 192, and I/O subsystem 193. The UAV secondary computer system 102 can include logic circuits, analog circuits, associated volatile and/or non-volatile memory, associated input/output data ports, power ports, etc., and include one or more software processes executing on one or more processors or computers. The UAV secondary computer system 102 can include memory 170. Memory 170 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 102 will be non-critical functions in nature. If the function fails, the UAV will still be able to safely operate. The UAV secondary computer system 102 can include operating system 172. In some implementations, the operating system 172 can be based on real time operating system (RTOS), UNIX, LINUX, OS X, WINDOWS, ANDROID or another operating system. Additionally, other software modules and applications may run on the operating system 172, such as an application module 174, database module 176, mission module 178 and contingency module 180. Operating system 172 may include instructions for handling basic system services and for performing hardware dependent tasks.

The UAV can include controllers 146. Controllers 146 may be used to interact with and operate a payload device 148, and other devices such as camera 149. Camera 149 can include a still-image camera, video camera, infrared camera, multispectral camera, stereo camera pair. In addition, controllers 146 may interact with a Lidar, radio transceiver, sonar, laser ranger, altimeter, TCAS, ADS-B (Automatic dependent surveillance-broadcast) transponder. Optionally, the secondary computer system 102 may have controllers to control payload devices.

Figure 2:
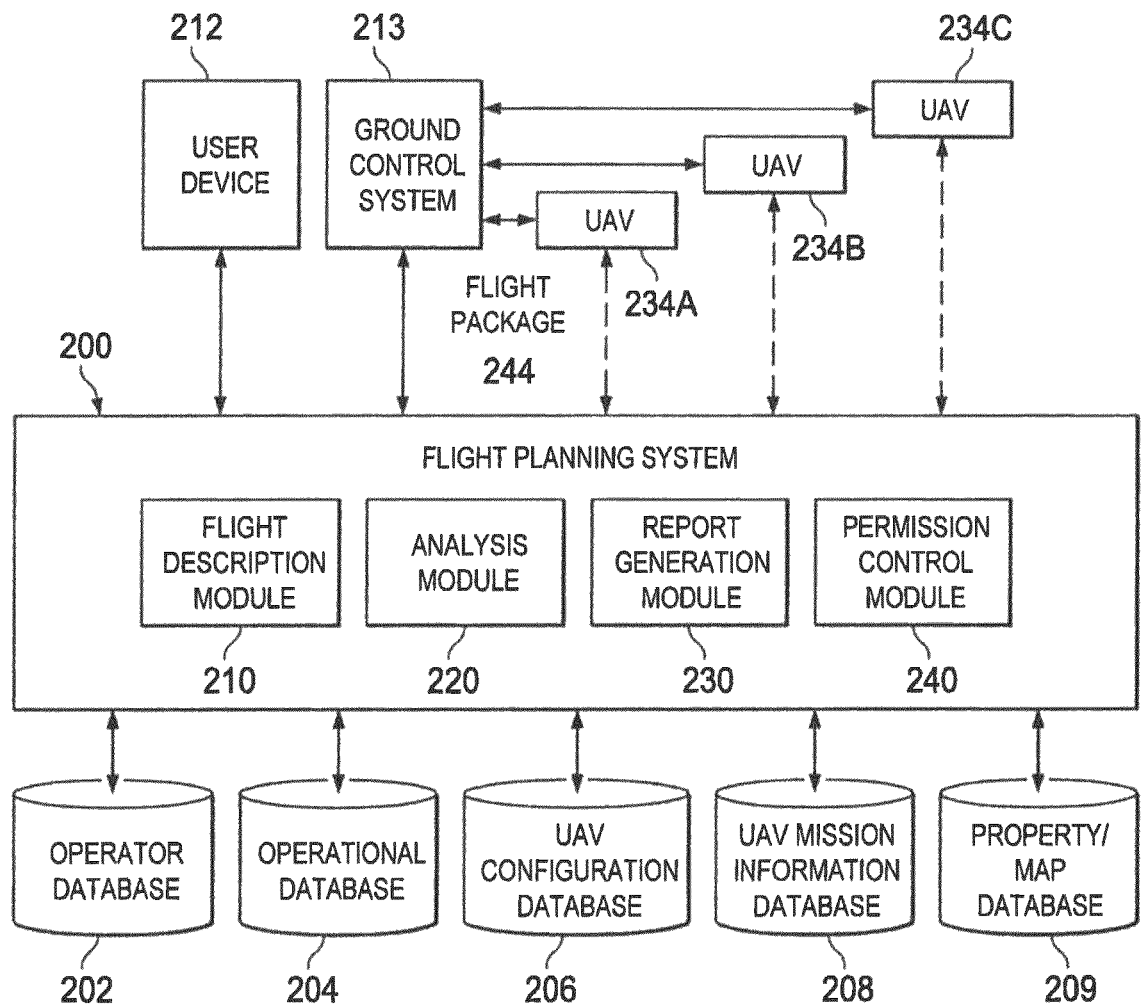
FIG. 2 is a block diagram illustrating an example flight planning system.

FIG. 2 is a block diagram illustrating an example flight planning system (FPS) 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209) storing information describing prior implemented flight plans and information associated with each flight plan (e.g., information describing a UAV, an operator, property/map, mission, database, and so on). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc., and include one or more software processes executing on one or more processors or computers. The FPS 200 can be a component of, or be coupled to, one or more user devices 212 or a ground control system (GCS) 213. A user device 212 can be a device including one or more processors and configured to send data to and receive data from one or more UAVs 234A, 234B and 234C. A GCS 213 can be a specialized user device 212 configured to control one or more aspects of a flight of UAVs 234A. 234B and 234C.

The FPS 200 may store, and maintain, flight operation information associated with a UAV. Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive (e.g., from an operator), and determine, information describing a flight plan. The FPS 200 can provide a flight package 244 associated with the flight plan to a UAV (e.g., UAV 234A, 234B, 234C) to implement. Additionally, the FPS 200 can store flight plan information, flight data log information, job information in the various databases.

The example FPS 200 includes a flight description module 210 that can generate interactive user interfaces (e.g., HTML or XML content for web pages) for rendering on a user device (e.g., user device 212). The interactive user interfaces may optionally be transmitted for display to the user device via a wireless network or another communication channel. User device 212 can receive, from an operator, information describing a flight plan to be performed (e.g., by UAV 234A, 234B, or 234C).

To describe one or more locations where the flight plan is to be conducted, a user interface may be configured to receive, from an operator, location information associated with the flight plan (e.g., an address of a home or property, geospatial coordinates of a structure to be inspected, and so on). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further provides functionality enabling the operator to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in the real world as illustrated by the imagery (e.g., geospatial coordinates that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information, and identify a geometric center of a convex area (e.g., a biggest convex area) within the geofence boundary that does not include obstructions (e.g., trees). For example, the flight description module 210 can determine an open area, such as an open pasture. Similarly, the flight description module 210 can obtain topographical information associated with the entered location information, and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is a safe, and can select the driveway as a safe launching and landing location, or can recommend the driveway as a safe launching and landing location.

The flight description module 210 can receive (e.g., from a user interface) survey or flight mission information via a flight package, for instance information indicating a particular type of survey for a UAV to perform (e.g., damage inspection, inspection of a vertical structure, or inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator using the user device 212 to specify that upon reaching a particular waypoint, the UAV is to activate a particular sensor, or other payload devices, such as an infra-red camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator to photographically inspect a specified location. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that, based on the received survey type, a UAV will require particular configuration information, and recommend the configuration information to the operator. For instance, the flight description module 210 can receive information identifying that hail damage is expected, or is to be looked for, and can determine that a UAV that includes particular sensors, and specific visual classifiers to identify hail damage, is needed. For example, the flight description module 210 can determine that a heat and/or thermal imaging sensor that includes specific visual classifiers that can distinguish hail damage from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles and so on). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the flight description module 210 can obtain scheduling information. Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide the determined flight plan as a flight package 244 directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244 as received. The user device 212 or GCS 213 can transmit the flight package 244 to the UAV 234A, 234B or 234C. Optionally, the flight package 244 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As an example, an application can effect, such as cause implementation of, a flight plan associated with inspecting vertical structures, and the UAV can be required to execute the application prior to initiation of the flight plan.

In particular, the FPS 200 may create a flight plan for automated or partially automated flight of a UAV, taking into consideration structural data to avoid situations where the UAV may fly out of VLOS of a base location. The base location can include one or more locations of an operator of a UAV. In some implementations, the base location can be a geospatial position of the user device 212 or a launching location of the UAV.

The FPS 200 may receive, via a user interface, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having an associated latitude and longitude coordinates, and an associated altitude. The FPS 200 may not allow a UAV waypoint where the VLOS from the base location (e.g., the launching location, or an area around the launching location), upon determining that the waypoint would be blocked because of a structure. The FPS 200 may use 3D polygonal data, topographical data or other structure data in generating the flight plan. The system can use a 3D coordinate system to determine, based on a base location and each waypoint location, whether the UAV would likely enter into a non-VLOS situation. The flight planning system 200 can then generate flight plan that avoids the non-VLOS situation, and including only the flight waypoints that would not cause a non-VLOS occurrence.

Additionally, the FPS 200 may determine a geofence boundary to limit flight of the UAV to a bounded area. The user interface may display the geofence boundary over one or more location images. Additionally, the FPS 200 may determine a survey area, and set the survey area within the geofence boundary.

The FPS 200 then receives, from a GCS 213 (or directly from the UAV), flight log data and collected sensor data after the UAV has conducted the flight plan. A user interface of the FPS 200 then displays at least a portion of sensor data collected by the UAV, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user device 212, including specialized user device 212 designated as GCS 213, can be a system of one or more computers, or software executing on a system of one or more computers, which is in communication with, or maintains, one or more databases, e.g., databases, storing information describing UAV flight operations and components. Each of user device 212 can be a system of one or more processors, graphics processors, logic circuits, analog circuits, associated volatile and/or non-volatile memory, associated input/output data ports, power ports, etc. Each of user device 212 can include one or more software processes executing on one or more processors or computers.

Although in one embodiment of the invention, the FPS 200 may be primarily used to create and transmit a flight package 244 to a UAV or GCS 213, the UAV or GCS 213 can initiate the request for a flight package 244 from the FPS 200. An operator may take the UAV or GCS 213 to a property location. The UAV or GCS 213 may then request a flight package, or an updated flight package using a current position of the UAV or GCS 213. For example, the UAV or GCS 213 can determine its geospatial position via a GNSS receiver (using GPS, GLONASS, Galileo or Beidou system). The UAV or GCS 213 can then transmit its location to the FPS 200, along with other identifying information about the requesting device, such as its unique identifier (UID), or media access control (MAC) address, etc. The FPS 200 will receive the request, and determine if an updated or changed flight package exists by comparing the device identifier with identifiers in a database storing the new or updated flight package information. If FPS 200 finds a new or updated flight package, then the FPS 200 transmits the flight package from the FPS 200. The UAV or GCS 213 can receive the flight package. A confirmation acknowledging receipt of the flight package may then be transmitted from the UAV or GCS 213 to the FPS 200. The FPS 200 will then update a database record to indicate that the particular flight package has been received. Moreover, the UAV or GCS 213 can supply the property location, and a new job request can be sent to the FPS 200. The FPS 200 may create a new flight package for the UAV or GCS 213.

For autonomous flight of a UAV (UAV 234A, 234B, or 234C), a flight plan may be created and transmitted to the UAV. The flight plan instructs the UAV with regard to a particular flight path. A flight plan may be created using a FPS 200, or a GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on a UAV computer system that uses the flight plan to automatically fly the UAV. The flight plan information may be provided to the GCS 213 and then to the UAV or directly to the UAV, in a flight package 244 comprising the flight plan and other information (such as contingency event instructions).

Using the FPS 200, or GCS 213, a UAV operator may select a series of geographically-based waypoints and a launching location for the UAV. Based on the waypoints, a flight plan may be constructed allowing the UAV to autonomously navigate itself. In some implementations, the FPS 200 or GCS 213 may automatically define a flight plan based on various criteria, such as an inspection type.

While the UAV computer system autopilot module is navigating the UAV according to a flight plan, certain aspects of the flight pattern may be controlled by the operator's user device 212. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the operator. The user device 212 may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212 can trigger a payload sensor while conducting the inspection. For example, the UAV may navigate via autopilot to a position over an inspection location. An operator then can provide input to the user device 212. The user device may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information to can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variably based on the proximity to a structure. Nudging the UAV allows the operator to move the UAV away from the structure if the operator sees that the UAV flying too close to the structure. The nudge command may be provided any time to the UAV while it is operating in an auto-piloted mode. The UAV should still enforce geofence boundaries (if one has been set) and not allow a nudge to cause the UAV to move beyond a geofence boundary envelope.

The FPS 200 can include an analysis module 220, a report generation module 230 and a permission control module 240. The analysis module 220 is configured to analyze a flight plan and determine whether a flight path include any sections where a UAV is out of VLOS from a base location, and provides alerts to warn such possible VLOS occurrence. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). The permission control module 240 is configured to impose one or more limits on flights of the UAV. The limits can include, for example, that the UAV shall stay inside or outside an envelope defined by geofences or by geographic coordinates, or that the UAV shall stay within VLOS of a base location (e.g., a location of user device 212).

Figure 3:
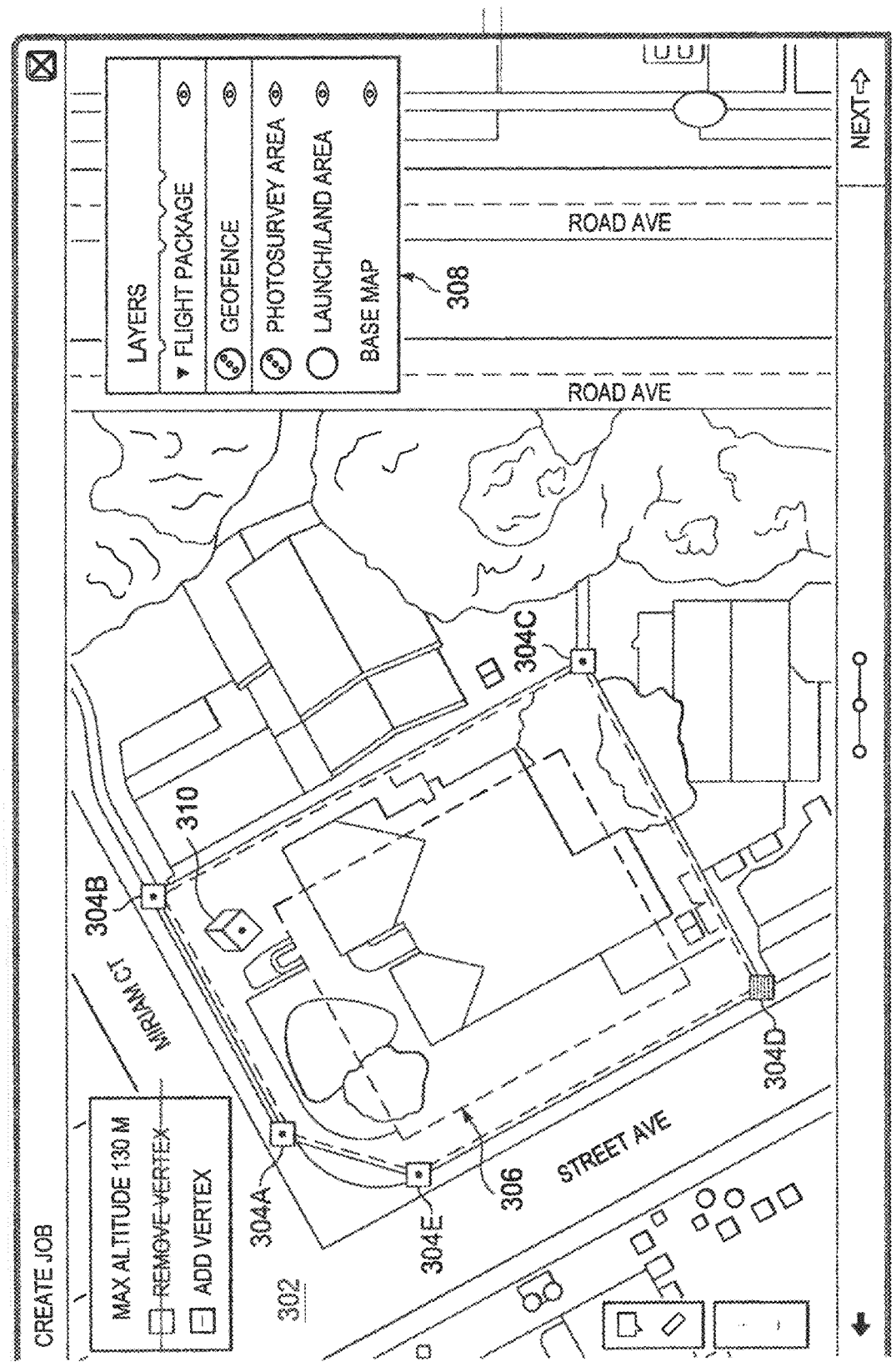
FIG. 3 illustrates an example user interface for determining a flight boundary geofence.

FIG. 3 illustrates an example user interface 300 for determining a geofence boundary. The user interface 300 is an example of an interactive user interface, generated by a system (e.g., the FPS 200, or a presentation system in communication with the FPS 200) that is configured to receive user inputs, access one or more databases, and update the user interface 300 in response to received user inputs. The user interface 300 can include a document (e.g., an interactive document such as a web page), or a web application, presented on a user device (e.g., a desktop, laptop, or tablet computer, a smart phone, or a wearable device, etc.).

The user interface 300 includes image 302 (e.g., satellite imagery as depicted) of a location entered by the user of the user interface 300. The image 302 included in the user interface 300 can be interactive. A user can zoom in and out of the image 302 to target a greater or smaller real-world area. For instance, the user can interact with a zoom control, or the user can utilize a touch surface (e.g., a touch screen) to zoom in and out (e.g., the user can pinch to zoom).

The user interface 300 enables the user to select areas on the image 302 that are defined by a user-specified shape. For example, the user interface 300 can receive a user selection of particular vertices that define the illustrated polygon (e.g., vertices 304A-E). The system can shade, or otherwise highlight, the internal portion of the user-specified shape. Additionally, the user interface 300 enables the user to select a particular vertex of the illustrated polygon (e.g., vertex 304A), and drag the shape into existence by moving a finger or stylus on a touch sensitive screen of the user device.

The user interface 300 can receive input for generating a flight path 306 for the UAV to include a launching and landing location 310. The user interface 300 may include a menu 308 for creating different representative layers of a flight plan. For example, menu 308 illustrates a flight plan specifying a geofence, a photo survey area, a launch/land area, and a base map. The menu 308 includes a geofence menu item that refers to the geofence as represented by the connected vertices 304A-304E. The menu 308 includes a photo survey area menu item representing the flight path 306. The menu 308 includes a launch/land area menu item representing the launching/landing locations 310. The menu 308 includes a base map menu item that represents the base image layer, which includes image 302.

As illustrated in FIG. 3, the image 302 includes a highlighted area that defines a geofence boundary to be enforced by a UAV when implementing a flight plan. Different types of geofences may be used by the UAV during flight operations. A geofence can include a two-dimensional (2D) or 3D location-based boundary. A geofence can be understood as a virtual boundary for a geographic location or a virtual surface around a geographic location in a 3D space. The geofence boundary can be represented on a map as one or more polygonal or rounded shapes, for example, a circle, rectangle, sphere, cylinder, cube, or other shapes or bodies. A geofence may also be a time-based (four-dimensional) virtual boundary where the geofence exists for a particular duration, for example, a number of hours or days, or for a specific time period, for example, from 2:00 PM to 4 PM occurring on certain days, or other periods of time. A 3D geofence may exist in a particular space above ground. A geofence may be represented by latitudinal and longitudinal connected points, or other coordinate systems. A geofence may be created such that the geofence has dynamic aspects where the geofence may increase or decrease in size based on various conditions. For UAV flight operations, geofence structures are received by the UAV and stored in non-volatile memory. The UAV can enforce a geofence, for example if the UAV moves outside of the geofence due to wind, location error (e.g., temporary location error, such as due to loss of GNSS), operator error (e.g., an operator assuming control of the UAV may be restricted from navigating outside of the geofence), the UAV can navigate back to within the geofence and optionally land at a landing area.

For UAV operations, different types of geofences may be created. To limit flight operations within a particular volumetric space, a 3D geofence may be created. Data representing the flight boundary geofence can be transmitted to the UAV operating system. The exemplary FPS or GCS may be used to create the geofence and transmit the geofence data structure to the UAV.

For both autonomous UAV flight operations and manually controlled flight operations, the UAV can be limited to flight within a flight boundary geofence. If for example, an operator of the UAV in a manually controlled mode attempts to maneuver the UAV outside of the flight boundary geofence, the UAV may detect a contingency condition (e.g., the UAV is about to fly outside of the geofence), and then automatically direct the UAV to return to a specified predetermined landing location. Furthermore, if the UAV is capable of hovering, such as a multi-rotor UAV, the UAV may be inhibited from moving across a flight boundary geofence, or perimeter, of the geofence, and the UAV can be set to hover and not continue past the perimeter of the geofence.

Optionally, the system can utilize property information, such as property boundaries, and automatically include a highlighted portion of the image 302 as being a possible flight boundary geofence. For instance, as illustrated in FIG. 3, portions of the flight boundary geofence defined by connected vertices 304A, 304B, 304C, 304D and 304E abut roads included in the real-world geographic area depicted in the image 302. The system can determine that the entered location information describes a particular property (e.g., an open clearing that borders the road), and can highlight the particular property. Optionally, the system can include a buffer from the property boundaries of the location to ensure that even when facing forces of nature (e.g., in a strong gust of wind), the UAV will remain within the property boundaries.

Property boundary information from a database can be used to create the flight boundary geofence to limit flight of the UAV within the property's boundary. The UAV can then be constrained for flight operations only within this geofence. The property information used to create the flight boundary geofence can be of various data types, for example, parcel polygons, vector, rasterized, shape files or other data types. For the particular property, the FPS 200 may create the flight boundary geofence based on the property shape data. The various data types ideally can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size. For example, the flight boundary geofence may be reduced in size by a set distance, for example 5 meters, towards a centroid of the property. Reduction of the flight boundary geofence creates a buffer zone. The buffer zone may help avoid an unintentional flyover of an adjacent property boundary. Optionally, the FPS may display an area with parcel polygonal data. An interface of the FPS may then receive a selection of one or more parcels. The FPS then can use the selections to create one or more jobs, and multiple geofence envelopes. For the multiple parcels, the operator would go to each parcel property, and conduct multiple jobs.

Optionally, the user interface 300 can be utilized by a UAV operator to indicate waypoints to be traveled to during the flight plan. For instance, the user can select portions of the image 302 to designate as waypoints, and the user interface 300 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 300.

Additionally, the user interface 300 can include text provided by the user that describes the flight plan. A different user can access the user interface 300, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Figure 4:
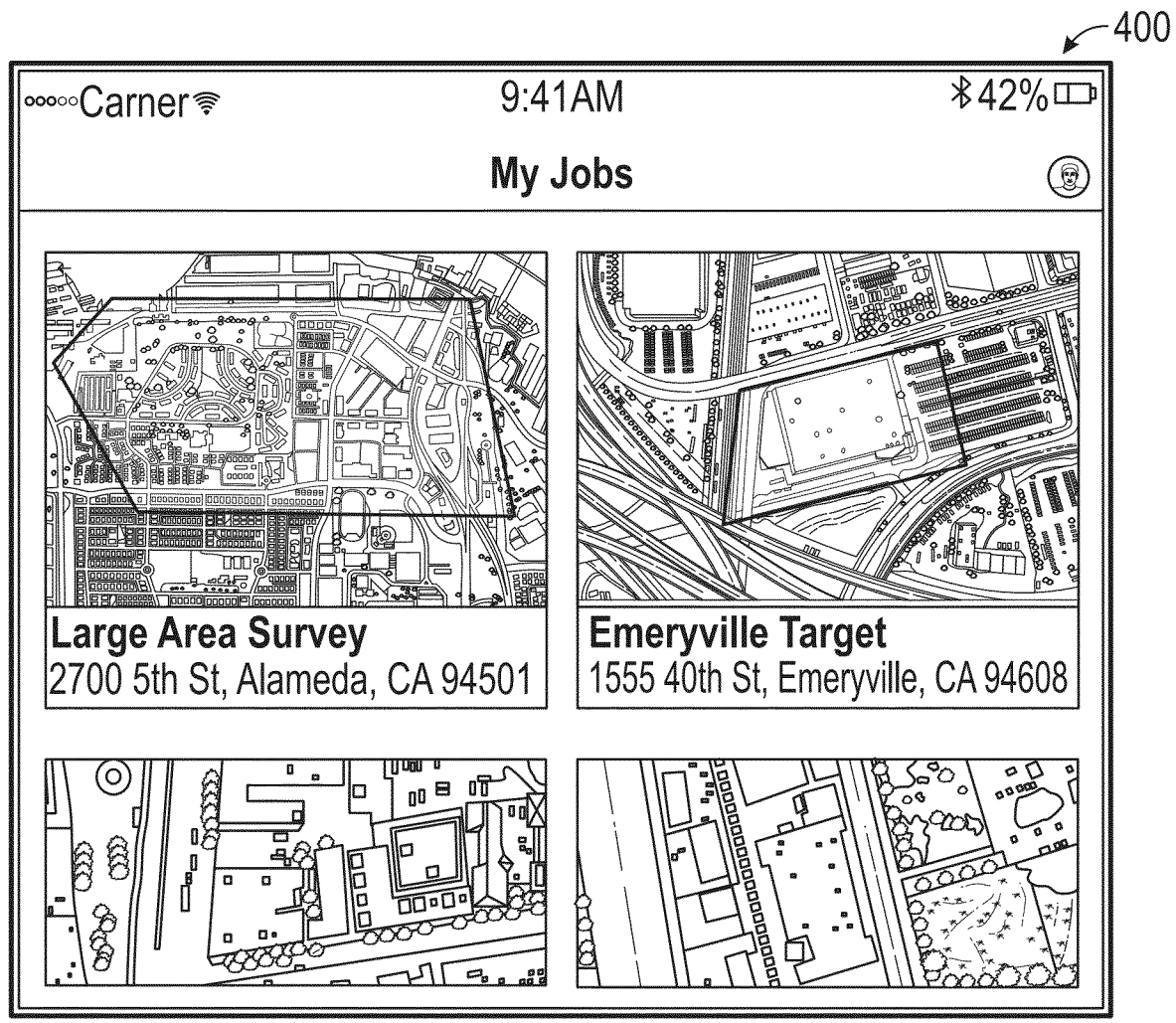
FIG. 4 illustrates an example user interface for displaying jobs available to an operator.

FIG. 4 illustrates an example user interface 400 for displaying and selecting a job assigned to an operator. Each of the jobs depict a location of the job (such as an address, or geo-spatial or other coordinates. The jobs assigned to the operator can be obtained by the user device based on login credentials of the operator. Each of the jobs depict an aerial view of the location where the job will be performed. A particular job is selectable by the user which then displays job specific information. For a respective job, the system may display an aerial view of where the job is to occur. To expedite processing, the aerial view may be a stored image, such as a gif, jpeg, or other type of image data set, that is provided from the cloud system to the operator's user device. In other embodiments, the aerial view of the location of the job, may be obtained in a real-time fashion via a call to a networked-based service, where an image(s) are obtained for the location of a respective job.

As discussed above, the user device may receive one or more jobs assigned to a particular operator. The operator may take the user device to a location. The device will determine the location of the device, using location services of the device. Once the device obtains its current location, the jobs presented to the operator, for example in FIG. 4, may be ordered based on proximity of the job site to the current location of the user device. Additionally, while not shown in FIG. 4, a distance to the location of the job may be computed by the device, and displayed next to the job information. Additionally, presented with a particular job, the estimated time to complete the job may be presented with the job information. While the jobs may be presented based on proximity to the current location, the jobs may be sorted or organized based on overall time to compete a job. This allows the operator to identify jobs that will require a certain amount of time to complete, and be able to estimate if a particular job should be under taken.

Moreover, the user interface may allow for selection of multiple jobs, and based on the required number of batteries required for each job, display a value or number of batteries that are needed to complete the jobs. This functionality allows an operator to compute prior to engagement of a series of jobs, the number of charged batteries required to perform the jobs, and can bring fully charged batteries to perform the multiple jobs without having to charge batteries used for one of the jobs.

Optionally, the number of charged batteries required to perform the jobs can be based on an ability of the batteries to be charged as the operator travels from job to job. As an example, distances between each job can be determined, and an estimate of an extent to which batteries can be charged while the operator travels from a first job to a second job can be taken in to account. Therefore, the operator may be allowed to utilize a lesser quantity of batteries if the operator is able to charge batteries while driving between jobs. For instance, during a first job the operator can utilize one or more batteries, and while driving to a subsequent job can begin charging the one or more batteries. If at the second job, the batteries are sufficiently charged to enable the second job (e.g., within a safe margin, for instance if upon completion of the second job the batteries have greater than a threshold charge remaining), the operator can utilize the same batteries. Alternatively, the operator can utilize other batteries and continue charging the initial batteries. Optionally, an order associated with each job can be based, at least in part, on an ability of batteries to sufficiently charged while the operator drives between jobs.

Figure 5A:
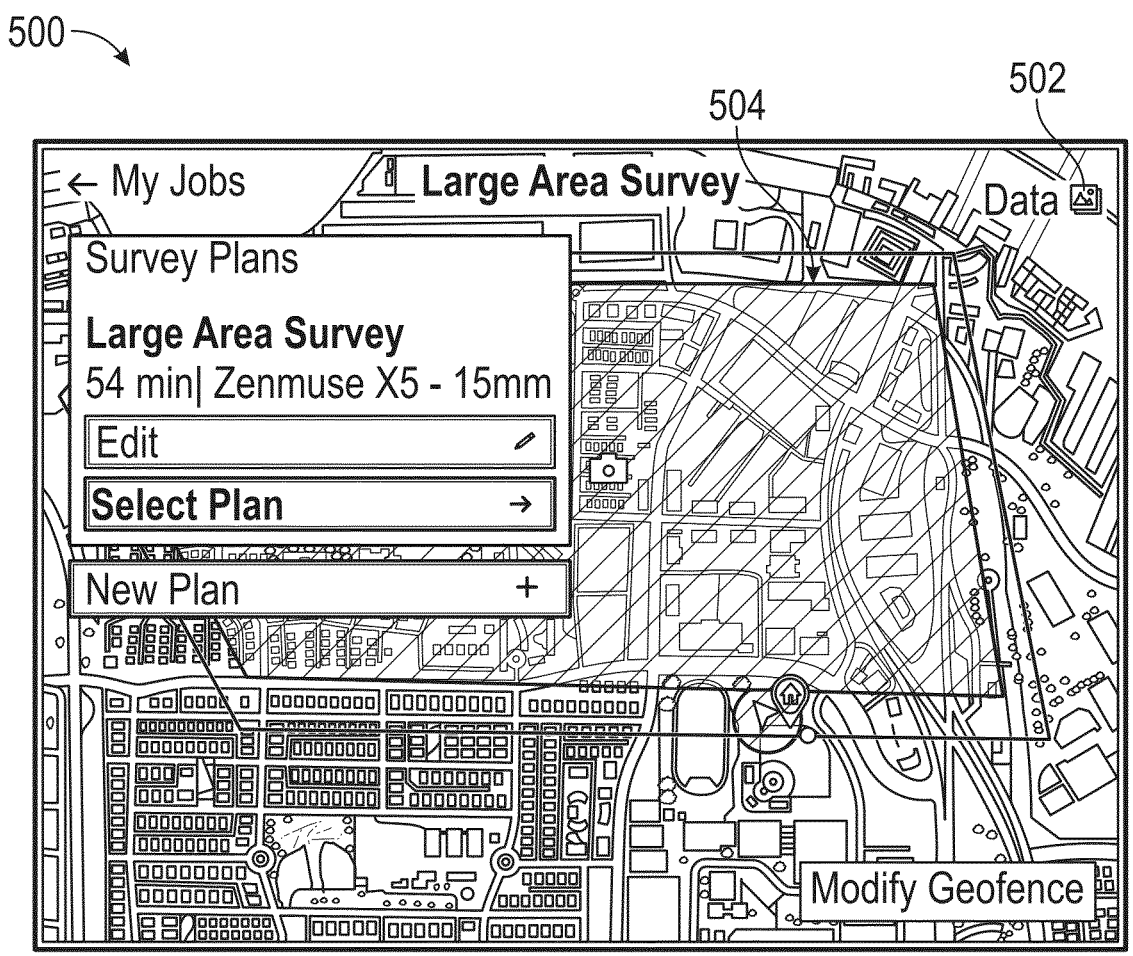
FIG. 5A illustrates an example user interface for displaying a selected job to be performed by the operator.

FIG. 5A illustrates an example user interface 500 for displaying a selected job from the user interface depicted in FIG. 4. In this example shown in FIG. 5A, the user selected the job for "Large Survey Area."

Figure 5B:
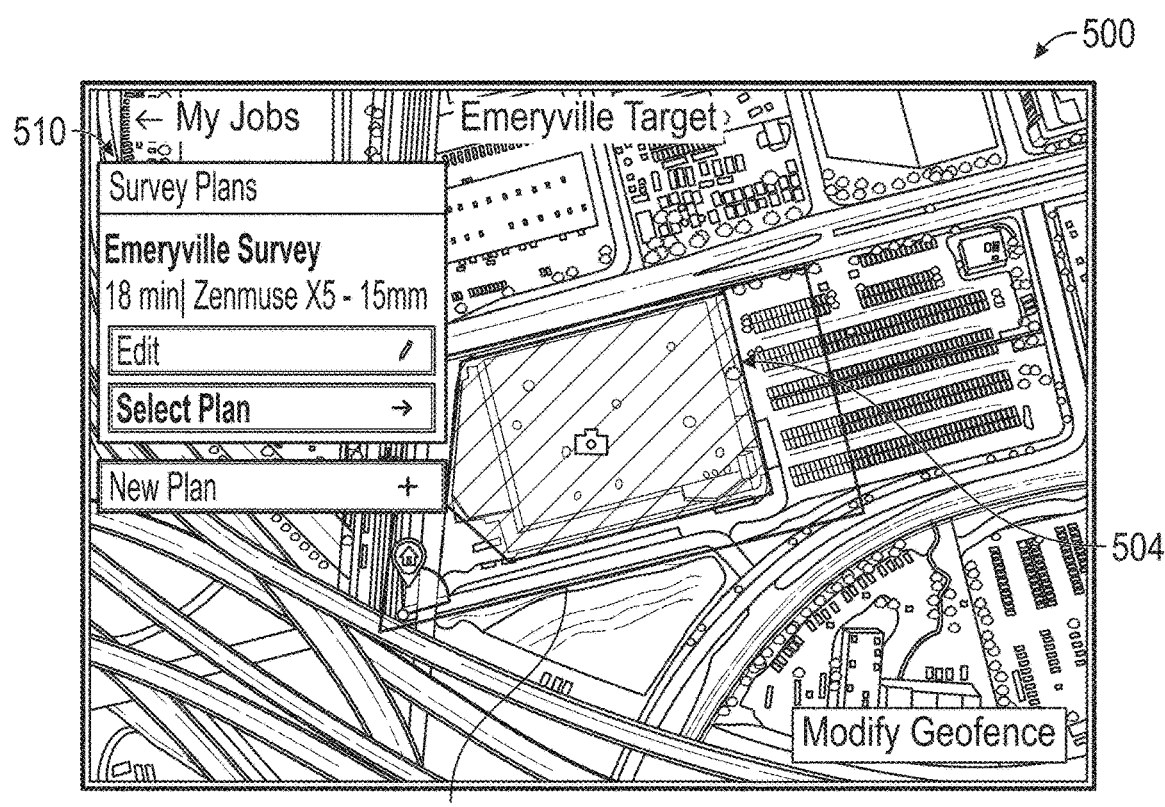
FIG. 5B illustrates an example user interface for displaying a selected job to be performed by the operator.

FIG. 5B illustrates another example user interface 500 for displaying a selected job from the user interface depicted in FIG. 4. In this example shown in FIG. 5B, the user selected the job for "Emeryville Target." The name of job 510 is displayed along with the duration of the job, and the particular camera and lens that will be used for the job. In FIG. 5A, the job name is "Large Survey Area", and the estimated duration of the job is 54 minutes. The UAV performing the job will take approximately 54 minutes to perform the survey. In comparison, FIG. 5B displays the job name as "Emeryville Target", and the estimated duration of the job is 18 minutes. In this instance, the UAV performing the job will take approximately 18 minutes to perform the survey.

In FIGS. 5A and 5B the survey area is displayed as a blue area 504. This area depicts the overall area in which the UAV will perform an inspection flight pattern, and obtain sensor data describing a property, structure, land, or other objects. A home location of the unmanned aerial vehicle is displayed. The home location can be set by the user device by determining a current geo-spatial location of the user device.

Additionally, the user interface 500, allow the user to modify a geofence boundary 508. This is displayed as a white polygonal box surrounding the survey area.

Figure 6:
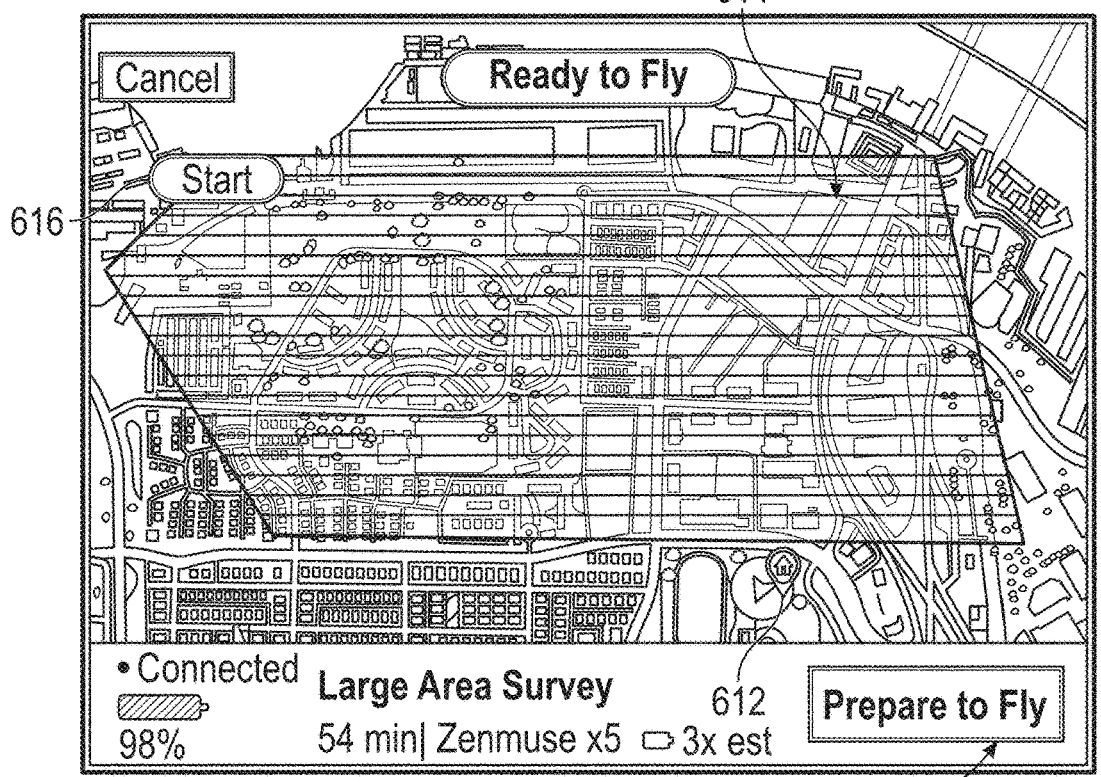
FIG. 6 illustrates an example user interface before a UAV is launched for a flight survey pattern.

FIG. 6 illustrates an example user interface 600 showing a flight plan that is ready to fly or perform. In FIG. 4, the "Select Plan" user interface affordance, such as a button, icon, etc. will display the screen of FIG. 6. As illustrated, the "Large Survey Area Job" is depicted. The user interface will display a battery status of the UAV that will perform the job, and the status of whether the user device is connected to the UAV that will perform the job. Similar to FIGS. 5A and 5B, the estimated total time and the camera type will be displayed. The user interface displays a flight pattern 614, a starting position of the flight pattern 616, and a home location 612 for the UAV. Additionally, the system will display the total number of battery needed to perform the overall job. In this instance, the number of batteries needed is 3×. For example, the system determines that for the particular UAV a fully charged battery used by the UAV may allow 25 minutes of flight time. Based on the flight pattern 614, in the example, the system will determine the amount of time to complete the flight path, the UAV will have a total of 54 minutes of flight time based on the estimated flight time divided by the safe allowable flight time of a fully charged battery 25 minutes, the system determines that 3 batteries are needed. In this case, the overall flight time could be 75 minutes. To continue with the survey, the operator of the device may select the "Prepare to Fly" user interface affordance 618, which displays the launch confirmation screen. Otherwise, the operator of the user device may select the "Cancel" user interface affordance which returns to the previous display screen, of FIG. 5A.

While the FIG. 6 shows a Start position 616 located at particular location. The system may selectively determine an optimal starting position based on the actual location of the user device, or the home location of the UAV. A flight pattern may be calculated, or re-calculated to moving the starting position of the flight pattern closer to the launch location of the UAV.

Once the user device connects to the UAV that will perform the flight inspection. The home location can be updated with the geo-spatial position of the UAV. For example, the GPS location of where the UAV is placed on the ground ready to be launched can be used as the home location. If the home location was previously set with the location of the user device, the home location can be updated with the location of the UAV. The user interface will then display the UAV at the new home location. The home location may be used by the system to set the location of where the UAV will fly to in the event of a contingency situation, for example a low battery condition.

Figure 7:
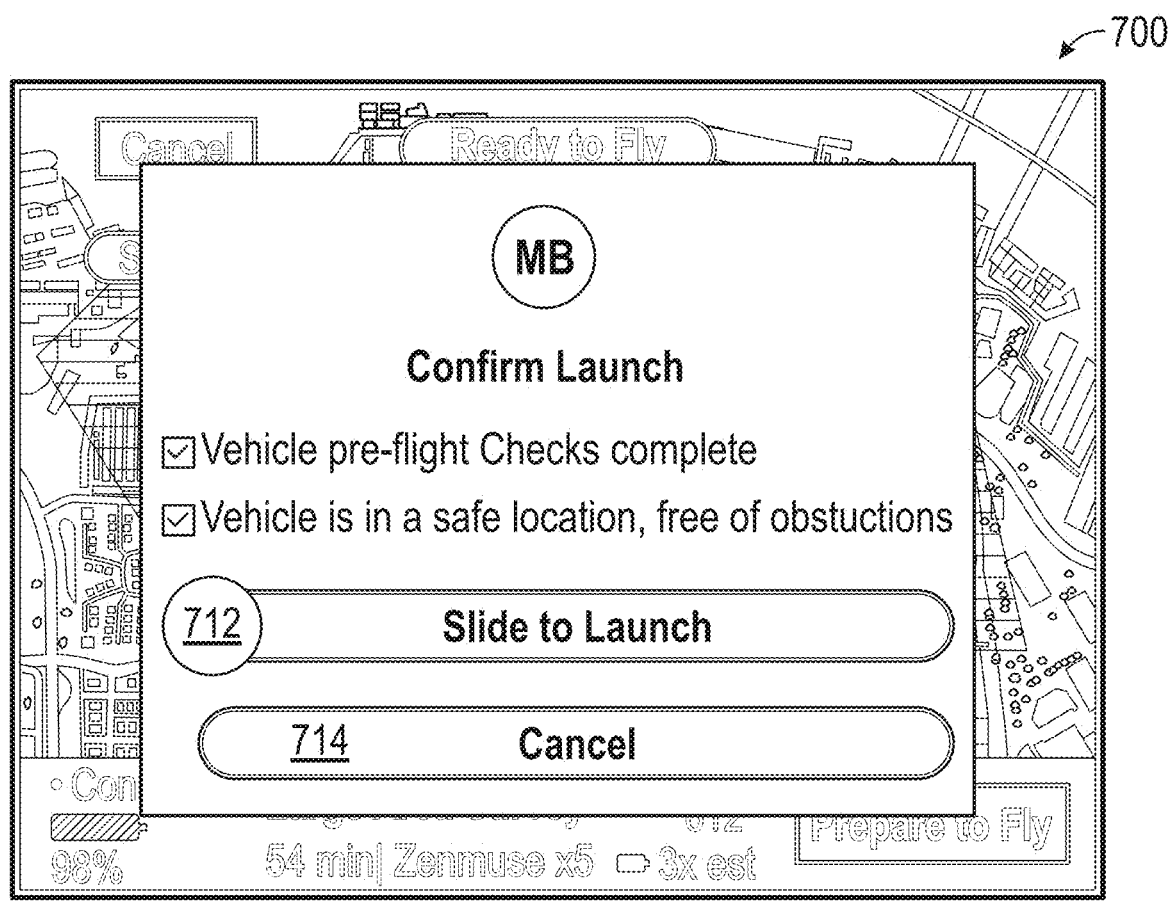
FIG. 7 illustrates an example user interface to confirm launch of the UAV.

FIG. 7 illustrates an example user interface 700 displaying a screen confirm to launch. This user interface allows the operator to launch the UAV to perform the inspection by the "Slide to Launch" user interface affordance 712. The interface requires that the operator confirm that certain requirements have been met. As illustrated, the first check is that the vehicle pre-flight checks have been completed. And that the vehicle is in a safe location, free of obstructions. Also, the operator may cancel the launch with the "Cancel" user interface affordance 714, which then displays the previous screen.

Figure 8A:
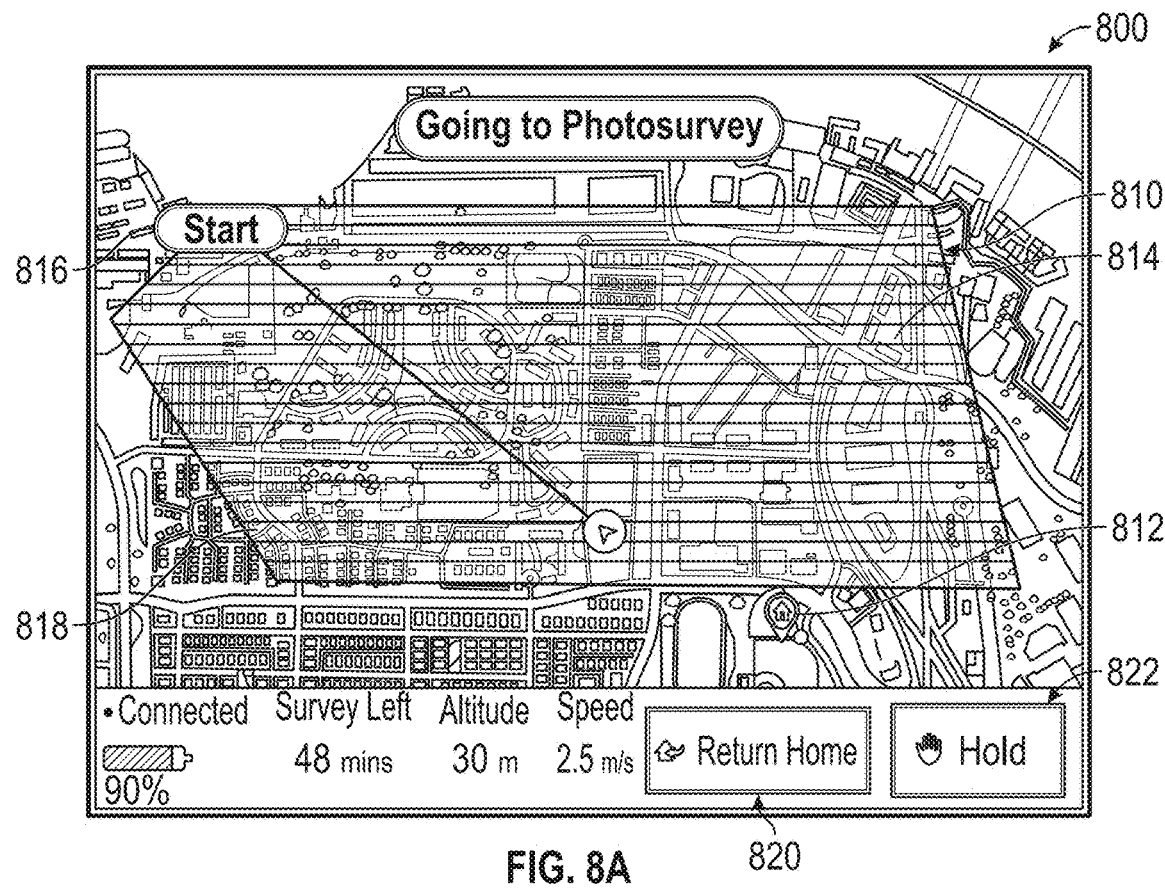
FIG. 8A illustrates an example user interface displaying a UAV flying to a start location of an inspection flight pattern.

FIG. 8A illustrates an example user interface 800 displaying a screen showing the UAV going to the start of the survey. The screen shows that status of the user device as connected with the UAV. The battery life remaining shows a percentage, alternative the battery life may be displayed in the amount of time remaining, or both. The user interface displays the time of the Survey Left, in the example, 48 minutes are shown remaining for the survey. The current altitude and speed of the UAV controlled by the user device is displayed, respectively 30 meters and 2.5 meters per second. The user interface 800 displays the UAV in flight location 818, and the starting position 816 of the inspection flight pattern. The blue polygonal area 810 is the inspection area, and the flight pattern is the horizontal linear pattern set within the inspection area. The interface 800 has a "Return Home" user interface affordance 820. When the interface receives a selection of this user interface affordance, the UAV will return back to the home location as described above. The home location is shown as a picture of a home 812. The interface 800 has a "Hold" user interface affordance 822. When the interface receives a selection of this user interface affordance, the UAV will stop forward movement, and hover in its then current aerial position.

Figure 8B:
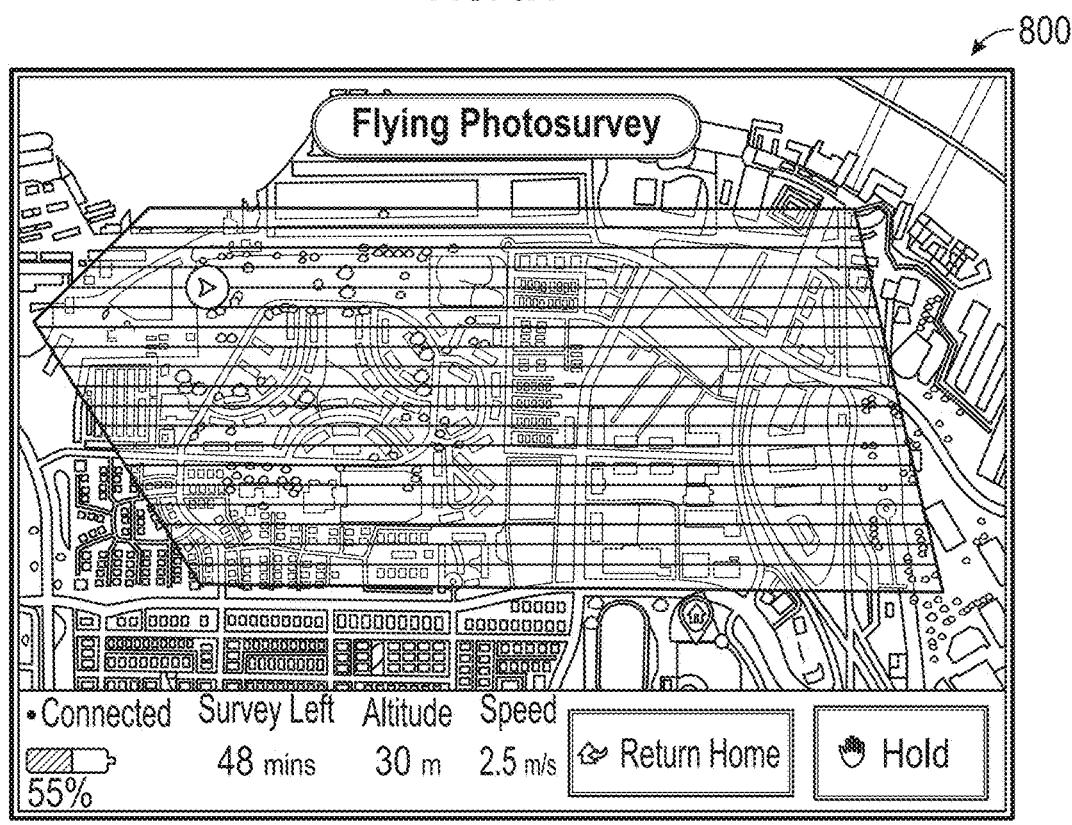
FIG. 8B illustrates an example user interface displaying a UAV flying a photosurvey.

FIG. 8B illustrates a user interface displaying the UAV continuing to perform the inspection survey. The user interface 800 displays a informational text that the UAV is flying the photosurvey. The battery life is shown as 55% remaining, 48 minutes of the survey remaining, the then current altitude is 30 meters, with the UAV moving at a rate of 2.5 meters/second.

Figure 8C:
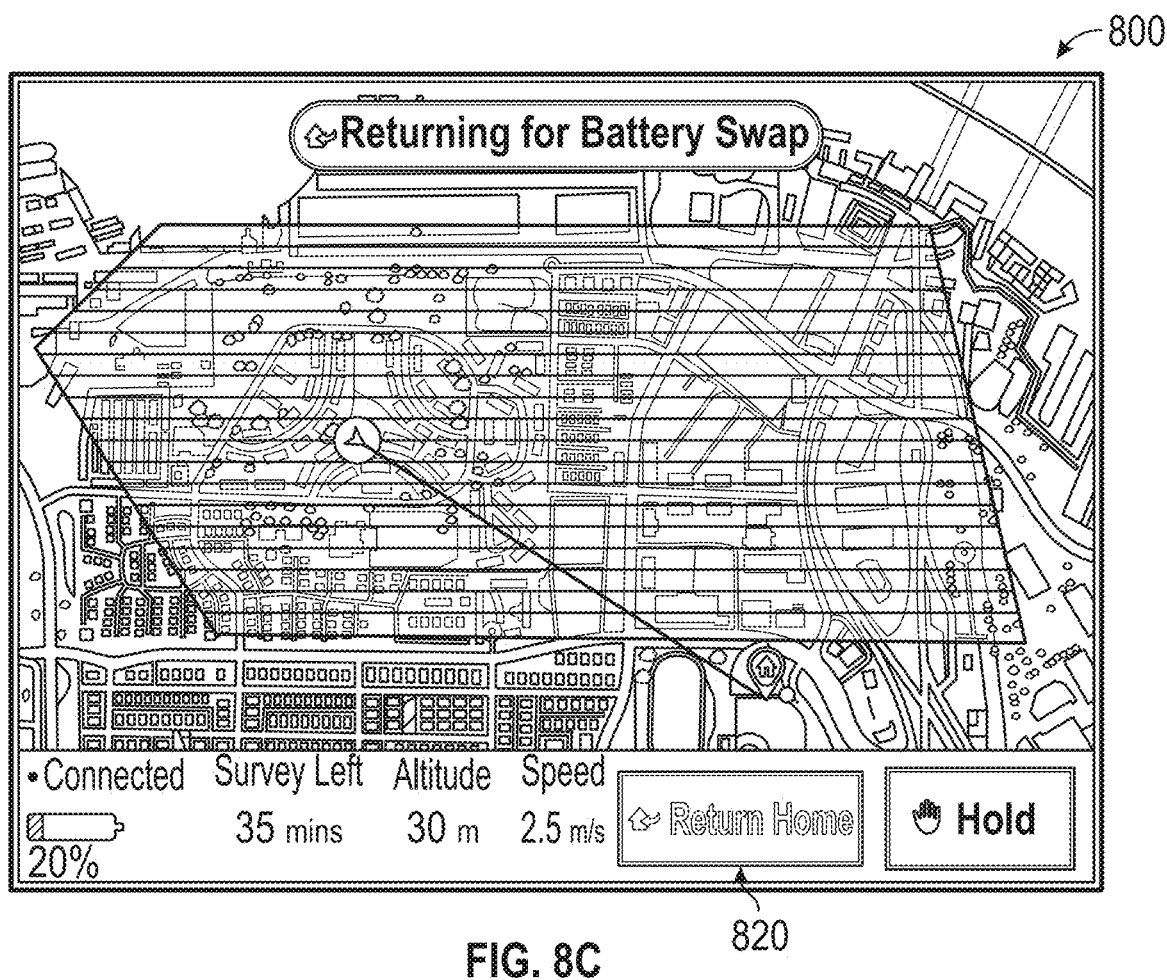
FIG. 8C illustrates an example user interface displaying a UAV returning to a home location for a battery swap.
Figure 9:
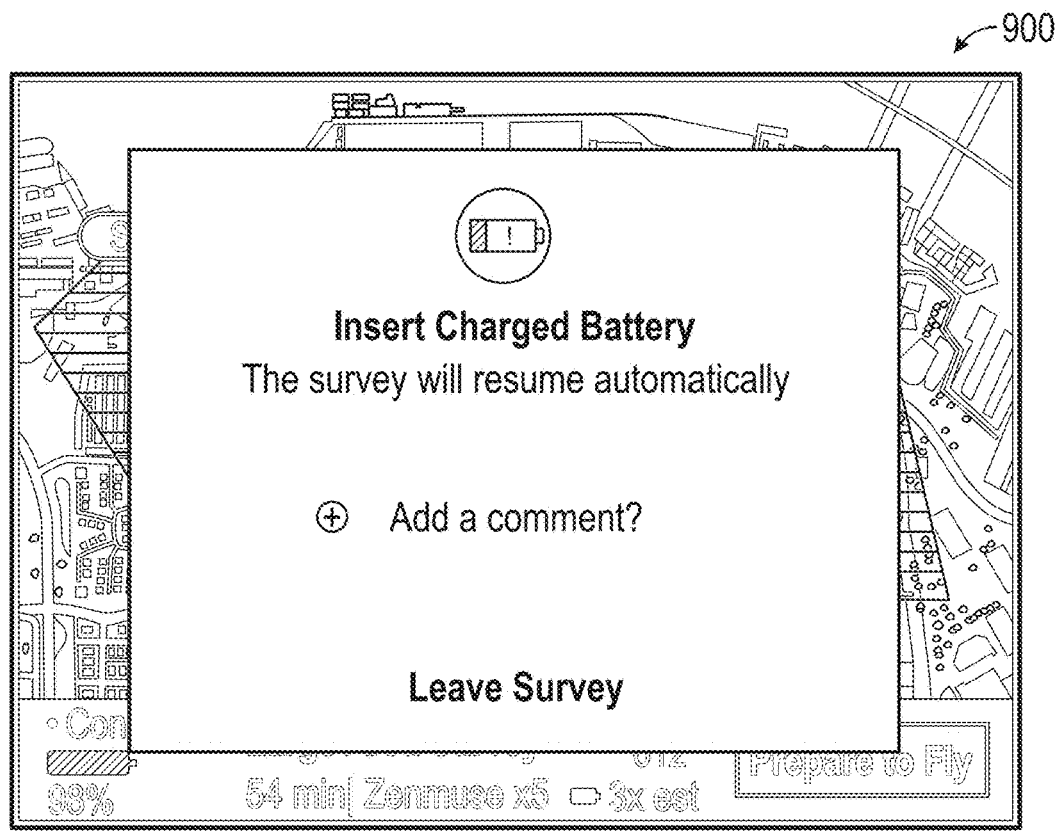
FIG. 9 illustrates an example user interface directing an operator to insert a charged battery into the UAV.

FIG. 8C illustrates a user interface displaying the UAV returning to the home location for a battery swap. The user interface 800 displays a informational text that the UAV is "Returning for Battery Swap". The battery life is shown as 20% remaining, 35 minutes of the survey remaining, the then current altitude is 30 meters, with the UAV moving at a rate of 2.5 meters/second. When the UAV returns home for a battery swap the "Return Home" user interface affordance 820 is shown as non-selectable as the UAV is currently returning to the home location.

After the UAV returns to the home location the UAV will land, and optionally the UAV will automatically inactivate. The user device will then display user interface 900 prompting the operator to insert a charged battery into the UAV. A comment or information may be collected by the user interface. For example, a statement about the condition of the battery. The comments will be captured and later provided to the cloud system. The user device may prompt, similar to the user interface 700 of FIG. 7, a confirmation to launch the UAV again. After the new charged battery is installed into the UAV, and the UAV activated again for flight, the UAV will resume the flight pattern, and will automatically fly to the location where the UAV stopped obtaining sensor data of the property, structure or land, as the case may be.

Figure 10:
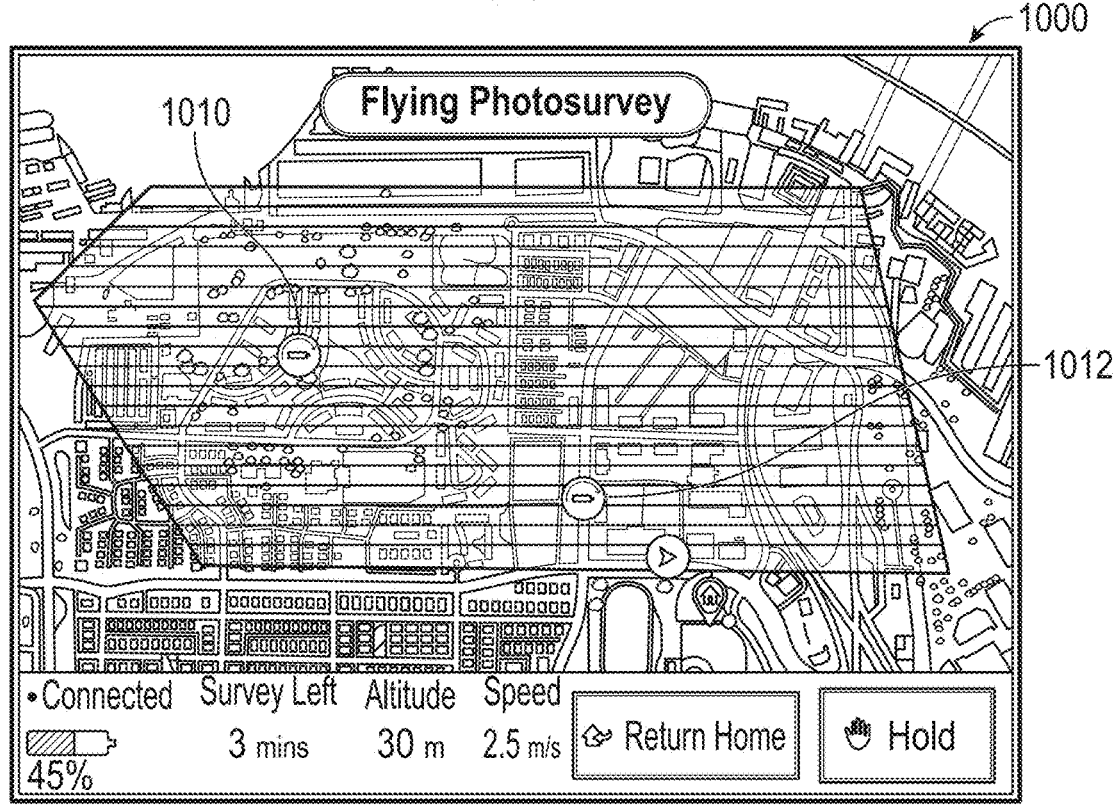
FIG. 10 illustrates an example user interface showing a UAV continuing to perform a photo inspection survey after battery swaps.

FIG. 10 illustrates a user interface where the UAV is continuing with the photo survey, and two battery swaps have already occurred as shown by the two battery icons 1010 and 1012. The flight path that has been completed by the UAV is shown in a solid color, for example blue, with the remainder of the photo survey yet to be completed in white. In FIG. 10, the survey remaining is shown as 3 minutes, the altitude is 30 meters, and the speed is 2.5 meters per second.

Figure 11:
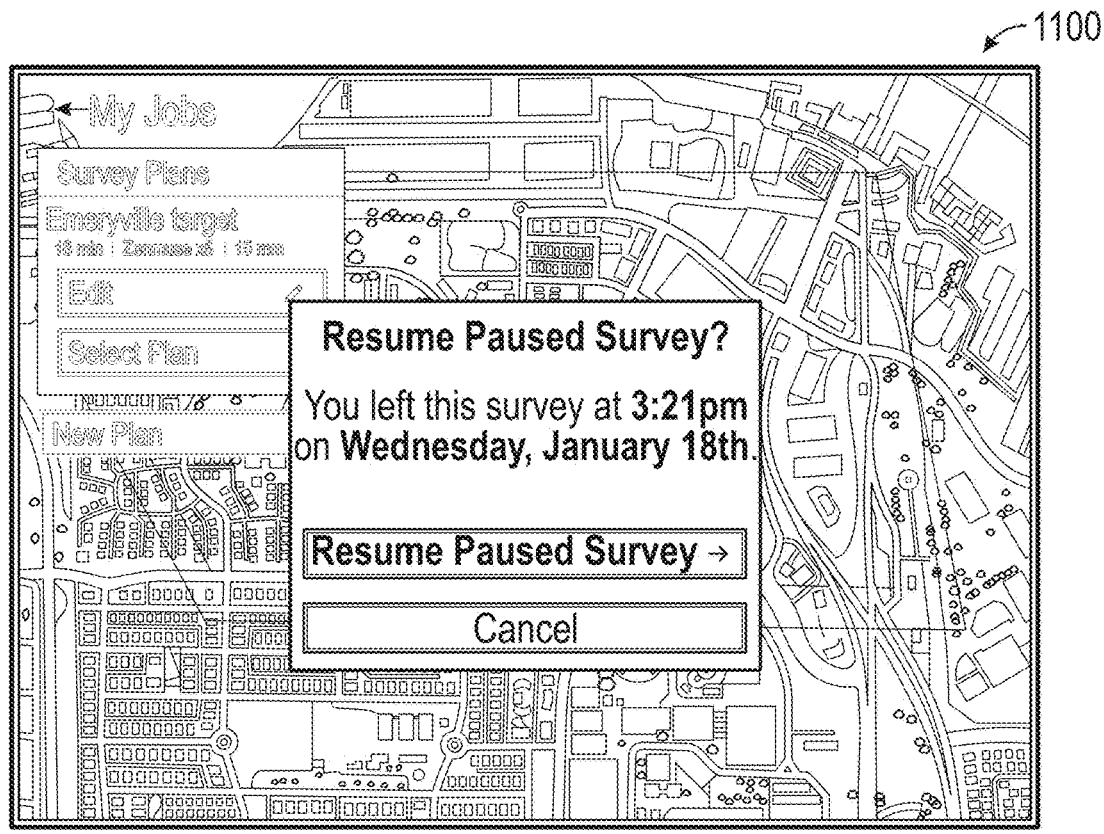
FIG. 11 illustrates an example user interface prompting an operator to resume a paused survey inspection.
Figure 12:
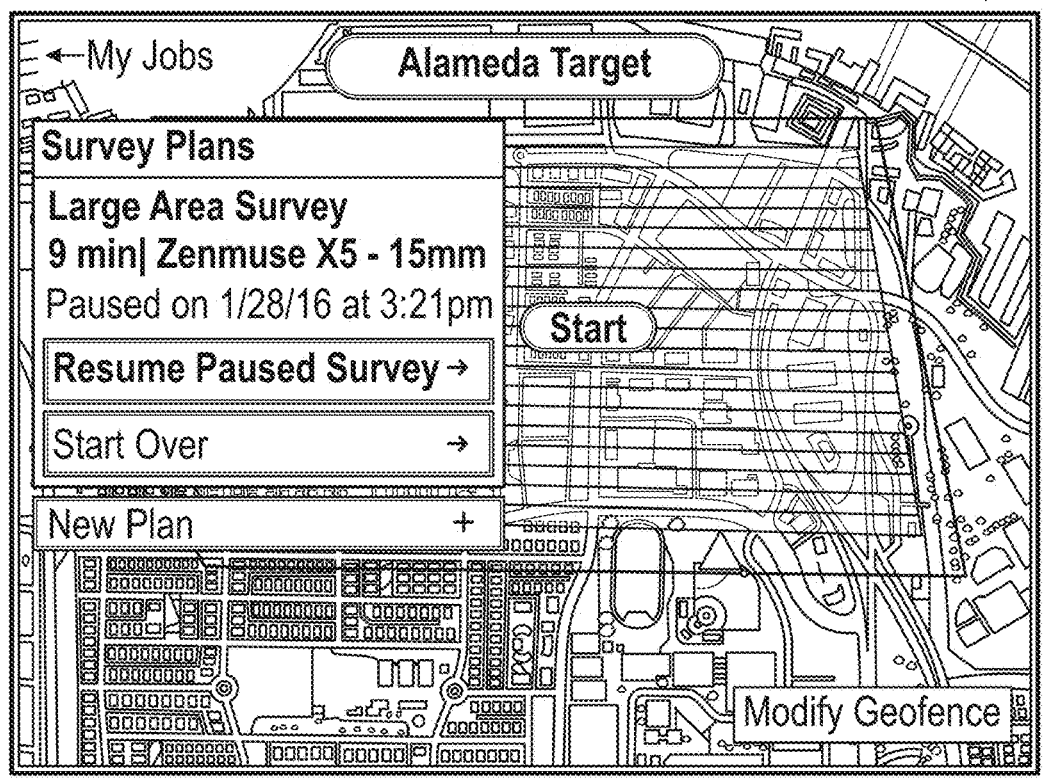
FIG. 12 illustrates an example user interface to resume a photo survey.

FIG. 11 illustrates a user interface 110 where a previous survey was paused. For example, during a survey, the inspection may be terminated early for various reasons. For example, unfavorable weather may be moving into the area of flight operations. As discussed above, the operator may select the return home user interface affordance, and the UAV will return back to the home location. Once a particular job is started, and paused, the system will allow the job to be resumed, or the job to be started over. As shown in the user interface 1200 of FIG. 12, the user device allows the survey to resume where it was paused. If the survey is resumed, the UAV will fly to the location where the flight pattern was paused, and then resume the flight pattern from that location.

Figure 13:
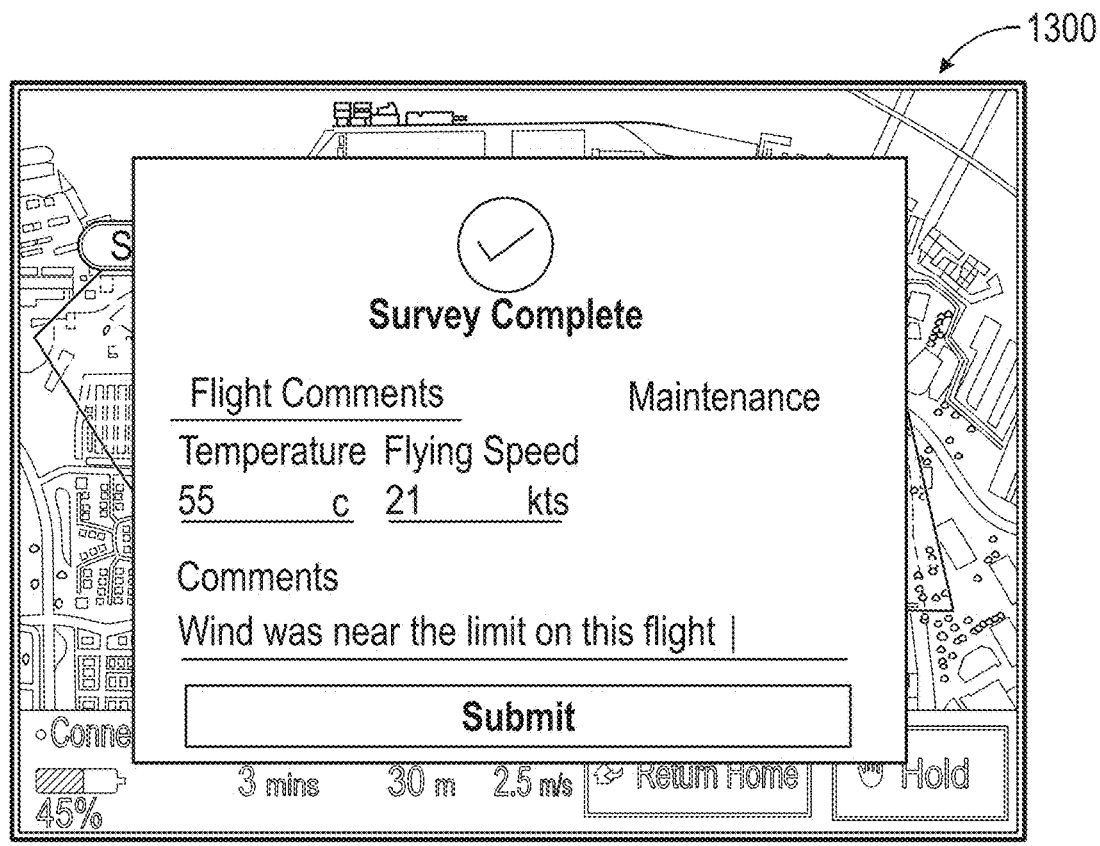
FIG. 13 illustrates an example user interface to submit information pertaining to a completed survey to a cloud-based system.

FIG. 13 illustrates a user interface 1300 once the survey is completed. This interface allows the operator of the device to enter information about the job, such as flight comments, maintenance information, other comments. Other data may be automatically be captured by the user device, or from the UAV, such as the ambient temperature, and the wind speed. This information then can be uploaded with flight logs, captured sensor data back to a cloud-based processing system.

Figure 14:
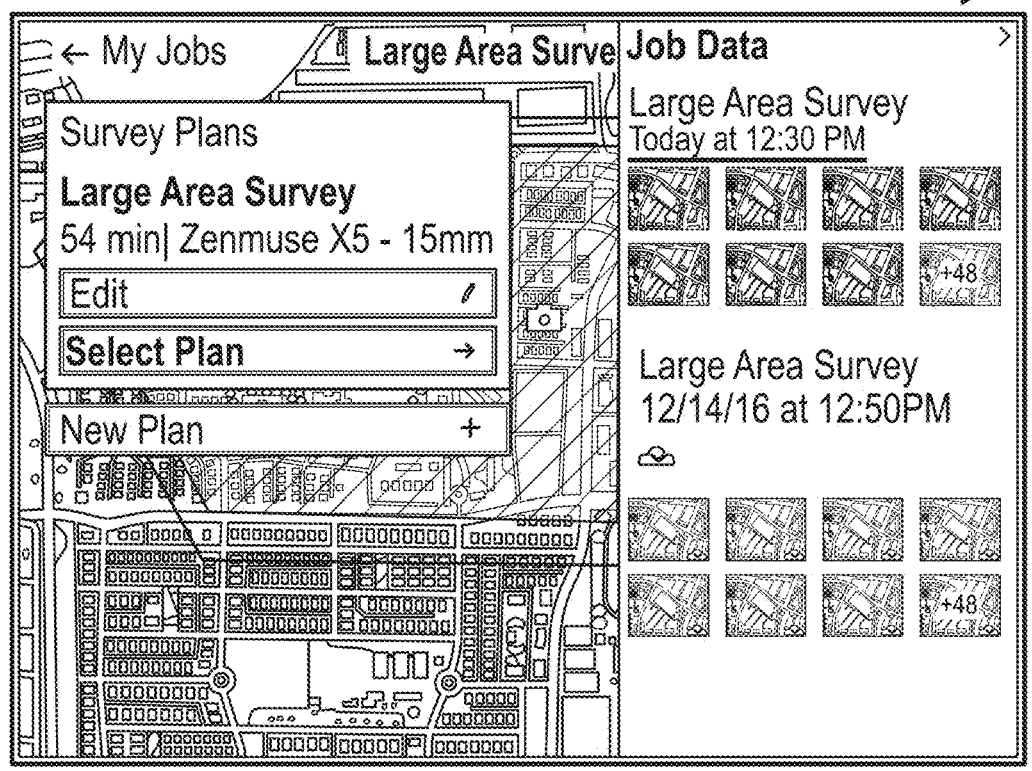
FIG. 14 illustrates an example user interface showing survey data obtained by a UAV for a completed or paused survey.

FIG. 14 illustrates a user interface 1400 displaying images and progress information concerning a job. For example, from the user interface of FIG. 5A selecting the data icon 502, information about a completed or paused survey may be displayed. In the example, FIG. 14 shows selectable images captured by the UAV during the survey, and that the particular images were successfully uploaded to the cloud-based processing system.

During normal operation of the UAV in reference to the user interfaces above, the UAV will be displayed along a path of its particular flight. The present location is obtained by the UAV, and provided to the user device. The user device then determines based on the geo-spatial position where the UAV is located along the flight pattern. A moving icon of the UAV is display. The user interface of the normal operation of the UAV is ideally configured without operational controls for the UAV. The normal operation of the UAV is an automated or auto-piloted navigation of the UAV. As such, flight controls for the UAV are not necessary during the automated flight. However, an auxiliary manual controller may be used in conjunction with the user device if manually control of the UAV is needed. However, the system may present soft controls in a user interface in certain situations. For example, in the While an auxiliary manual controller may be used, a soft controller may in combination with a manual controller, or instead of a manual controller.

While the UAV is performing an automated flight pattern, the UAV or user device may experience contingency situations where manual operation of the UAV is needed. In such cases, a pop-up software control for the UAV may be displayed. For example, in the event of a detected or degraded GPS signal or availability, the system may present the operator with a user interface that indicates that GPS has been lost, and provides user interface controls allowing the operator to control the UAV to a safe landing location.

Figure 15:
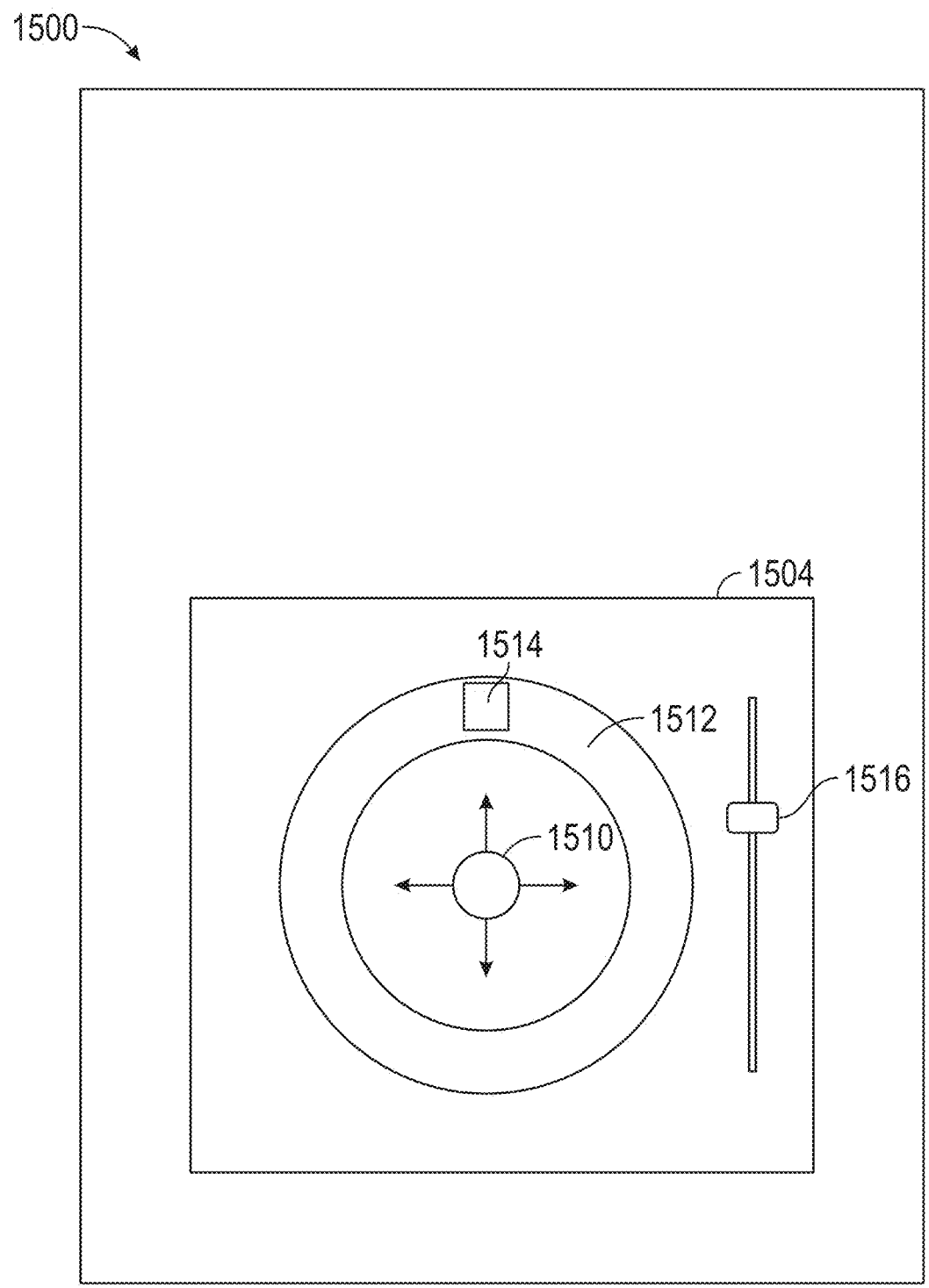
FIG. 15 illustrates an example user interface showing pop-up controls for navigating the UAV.

FIG. 15 illustrates an example user interface showing pop-up controls for navigating the UAV. The user interface 1500 of the user device may display pop-up control 1504 as discussed above. The system may allow for configuration of where the pop-up control is initially displayed. For example, the system may have a user interface for setting a location of where the pop-up control is display, indicating lower right, lower left, etc. Or the operator of the device, may set the location of the pop-up control 1504 by moving the window around the display 1500. When the system experiences a situation or event to display the pop-up control, then the control will display where the user set the location. While different pop-up controls may be used, the example control is ideally suited for one-handed operation of the UAV. The operator may hold the user device with one hand, and manually flight the UAV with the other hand. The pop-up control 1504 shows a soft toggle 1510, a ring 1512 with an orientation indicator 1514 of the UAV, and a slider 1516. The soft toggle 1510 allows for horizontal directional control of the UAV. The arrows originating from the soft toggle 1510 indicate direction of movement. The toggle may be moved in any 360 degree direction from the center of the soft toggle. Based on the relative distance from the center of the toggle, the UAV vehicle speed may be varied. For example, the farther the distance from the direction of the center of the origin location of soft toggle, the speed of the UAV would be increased. While there is a maximum distance the toggle may be moved from the origin, the maximum speed may be set via a configuration option for the UAV to be flown for the survey. Also, the maximum horizontal directional speed may be preconfigured. For example, since the pop-up control is ideally used for contingency operations, the horizontal speed may be limited to a maximum speed, such as 15 meters/sec. The relative position of the toggle in relation to the origin location and the maximum toggle position can be determined by the system, and then a relative speed can be calculated by correlating the position to the speed range.

The pop-up control may display a ring 1512 with an orientation indicator 1514. The orientation indicator 1514 moves around the ring 1512 based on the orientation of the front of the UAV while in flight. As discussed above, when setting the home location for example, a magnetic orientation for a front portion of the UAV may be determined. The front of the UAV may then be established. While in flight the UAV may rotate, and the front of the UAV may then be oriented in a position that is different from the original front orientation of the UAV before flight. During flight the orientation indicator 1514 will move around the ring, indicating an orientation position relative to the original orientation position. The UAV periodically obtains a magnetic heading, and the system can then determine the relative position to the original front position of the UAV. In certain embodiments, the system allows the operator to touch or select the orientation indicator, which then rotates the UAV in a horizontal 360 degree fashion. The allows the operator to reorient the front of the UAV.

For example, if a contingency occurs, such as a lost GPS event, the system utilize may use the last known position and magnetic heading of the front of the UAV, the known launch/land location, and assumptions about the operators location, to create a coordinate system for the relative directional changes required to control the aircraft. That is, when a lost GPS event occurs, a command to go left should cause the aircraft to the move to the left relative to the operators current location, as determined by the device, if facing the aircraft. At the time that the lost GPS event occurs, the aircraft will automatically rotate so that it is facing away from the operator. If the contingency occurs, in one embodiment, the front of the UAV may automatically reorient the front of the UAV such that the front of the UAV is facing away from the operator. The system may compare the last known location of the UAV, and of the user device to determine in which direction the UAV should re-orient. The orientation indicator of the user interface will move accordingly and the system will reorient the indicator at top of the display, as shown in FIG. 15.

Additionally, the pop-up control 1504 has a vertical control slider 1516 or some other user affordance that allows controlling the vertical ascent or descent of the UAV. Similar to the soft toggle 1510, the vertical control slider (or toggle), may be graduated to allow for ascent or descent speed maximum. If a slider is used for example, the slider may be set to a threshold distance from the maximum flight altitude for the UAV. The maximum flight altitude may be defined in information parameters for the received job, or may be set via a user interface of the system allowing the operator to set a maximum altitude in which the UAV may fly. The slider then if moved to the upward most position will then move the UAV to a set altitude may be set as a relative altitude above the surfaces (for example 400 ft above the ground), of for altitude, such as a mean surface level. Additionally, a toggle or other software user affordance may be used to control the vertical descent of the UAV.

While navigating the UAV with the pop-up control, the system will enforce any set geofence such that the UAV is restricted to flight within the geofence boundary.

In-Flight Compliance. During flight of the UAV, certain situations may arise that would cause the UAV to be in possible violation of regulations. Assess possible compliance violation. For example, although the operator may have performed a pre-flight check for possible areas of restricted flight, the possibility exists that a TFR (temporary flight restriction) may be issued by an aviation authority. The system will periodically check to identify if any new TFR has occurred since the UAV begun its aerial survey. The geo-spatial location of the UAV is checked by the system to determine whether the location of the UAV is in the area of any new "pop-up" TFR. If the system determines that the UAV is operating in the area designated for the TFR, then the system would provide a command to the UAV to return to the home location.

Additionally, the system may determine the UAV is flying within certain times of day for example between down and dusk. The system can obtain the local time tables for the location where a particular job is to occur, and identify dawn and dusk times. In other words, the system can determine a particular window when the UAV may perform operations.

Also, the UAV can detect ambient lighting conditions, and determine if the UAV is likely flying in night conditions or in obscured visibility. If such conditions are detected, the UAV may be instructed to return to the home location. Upon detection of such conditions, optionally, the system may present to operator, via a user interface, a request for confirmation that the UAV is flying in visual conditions that meeting regulations. This would allow the operator to respond to the situation, and confirm whether meteorological conditions are, or are not suitable for the particular flight.

Focus Racking. As discussed above, the UAV performs an inspection flight pattern with a flight path over an area of land or of a property. The flight pattern is provided, in whole to the UAV, or provided as sequential instructions from the user device to the UAV, or a combination thereof. The flight pattern includes waypoints which may be specific geo-spatial locations of where sensor information is to be obtained. Or the flight pattern may cause the UAV to periodically obtain observations along the flight path of the UAV. In either case, where the UAV will obtain sensor information, the UAV will be instructed to pause, the UAV will hold at a particular attitude, while at that altitude, the camera of the will be instructed to obtain multiple digital images. Each image will be focus-racked, that is, the focus ring, or focusing of the camera, will be set at different values along a continuum. This will allow the camera to obtain images that will be in focus along the continuum. The multiple images are geo-referenced for the particular location. For example, at a first waypoint, the UAV may take 5 images, each of these images would be taken at a constant altitude, say 200 feet above the ground. Due to variability or errors in GPS information or signal data, the multiple images likely will provide a clearly focused image. The system can determine based on sharpness or other image processing techniques which of the 5 images are the sharpest, or best suited for photogrammetry.

Return to Launch Location for Battery Exchange. Often to inspect a large area, such as many acres, the inspection of the area will require multiple batteries to be used by a UAV to fully complete the inspection. While some commercial and proprietary UAVs are rated to fly under battery power for a certain time duration, for example 28 minutes, for safety reasons, the UAV should not consume the entire charge of the battery, or come close to a percentage discharge of the battery, but instead leave at least a reserve charge of a certain percentage. This allows for contingency events where the UAV may need to return home to land or to land immediately. The complexity of flight planning increases significantly where an area to be inspected or survey encompasses a large geographic area, and multiple batteries are needed to fly the UAV along the survey. Some UAV systems automatically cause the UAV to return home to land when the battery is at a particular discharge level. While this is an important safety feature, it is not ideal just to fly the UAV along an autonomous flight pattern, and then have the UAV automatically return to the launch location. An exemplary inspection pattern flown by a UAV to inspect an area may be a radiator pattern where the UAV flies along an inspection leg in one direction, then makes a turn or a change in course of flight, and flies along an inspection leg in the opposite direction. This pattern continues until the survey is complete. However, for large areas, as the UAV flies along the pattern, it is possible that the UAV consumes battery power while conducting the pattern, to a battery discharge level where the UAV is forced to return to land. When this occurs, an operator would install a new battery, the UAV when launched again would return to the location where it left off, and then resume the flight pattern from that location. This may create a situation where consumption of battery power is inefficient. Also, this approach may cause an immediate return home to land contingency because the UAV does not have enough battery power to return back to the launch location.

To address this inefficiency, and potential safety hazard, the system may determine multiple legs of a survey for a selected inspection area. The configuration of the legs are organized or positioned to optimize or maximize the use of a battery for an aerial survey that will likely require 2 or more batteries to complete the inspection. However, the system may be used to determine if 1 battery is sufficient for an autonomous flight pattern/inspection. In one embodiment, the system receives a selection of a geo-graphic area for autonomous inspection or surveying by a UAV. For example, a user interface may present one or more aerial/satellite images of an area. An operator may then select an area to be inspected by the UAV. The system determines a path for a UAV flight pattern such that the UAV obtains a desired image overlap, and desired ground sampling distance (GSD) for digital images to be captured by the UAV during the inspection. The images will typically later be used in photogrammetric processing to create geo-rectified, composite images, or 2- or 3-dimension models or point clouds of the area surveyed. The determined flight pattern may be a typical radiator pattern as described above, or some other pattern, such as a cross-hatch pattern, radial pattern, spiral pattern, or other patterns. In one embodiment, the system determines the overall estimated duration of the flight pattern to identify the number of batteries likely to be used to complete the autonomous flight pattern. The system determines or estimates from a starting position (i.e., a launch location) to the beginning of an inspection leg, the time duration, and/or distance, the UAV may fly along the flight pattern until the battery will reach a particular discharge level. And compute an estimated position along the flight pattern where the UAV would return back to the landing location such that the UAV arrives safely to the landing location at a predicted or predetermined battery discharge level. For example, in planning the flight, the ground control station may estimate to fly along a course of the flight pattern, the UAV will reach an estimated discharge level of 80%, or 20% remaining at a particular geo-spatial location. The system will then compute a distance from the particular geo-spatial location back to the launch location, and determine an estimated total discharge level to complete the en route leg, the inspection leg, and the return home to land leg.

The estimated total discharge level may be set to optimally utilize the battery. For example, the total discharge level may be set to 5% remaining or increased to provide a margin of safety, such as 10%, 15%, etc., remaining. Likewise the initial discharge level may be set to a particular value, such as 80% discharge, 75% discharge, etc.

Also, the system may determine or estimate that for points along a flight pattern, an estimated battery usage and/or flight duration to the point, and also determine, an estimated battery usage and/or flight duration from the point to the launch location. A total estimated flight duration and/or battery usage then can be evaluated by the system for the UAV to fly to a particular point along the flight pattern, and return home to land. This estimate can be performed in a loop-wise fashion for successive locations based on interval distance along the flight pattern. For example, every successive 20 meter positions along a flight pattern can be evaluated. The system can then identify a particular geo-spatial location along the flight path where the distance flown along the flight pattern, and the distance from that particular geo-spatial location along flight path to return home will approximately utilize a certain battery consumption. If the total flight of the UAV for the evaluated geo-spatial location along the flight pattern, and the flight to return home and land meets a desired total battery percentage usage, or meets a minimum battery percentage reserve level, then that point along the flight pattern is selected as the point when the UAV will return home and land.

Figure 18:
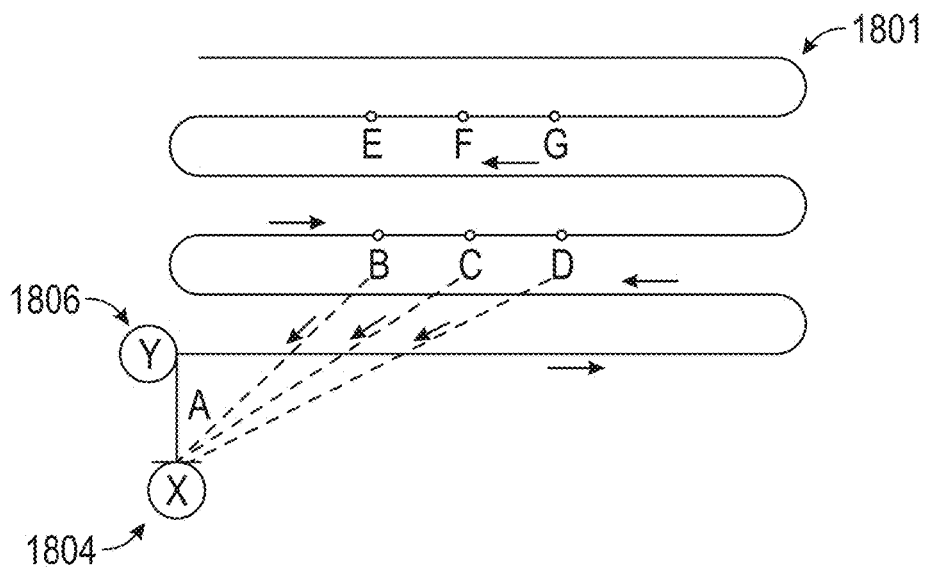
FIG. 18 illustrates an example process of determining a return home to land point along a flight pattern.

Referring to FIG. 18, the figure illustrates a simple flight pattern where the system determines a return to home location along the flight pattern so that a battery may be replaced. In one embodiment, the system first determines a flight pattern 1801 for the UAV to conduct an autonomous survey. The system determines from a launch location for the UAV (for example, a launch location for specific pre-determined geo-spatial location, a then current geo-spatial location of the ground control station used to conduct the survey, or a geo-spatial position from a UAV that has been placed on the ground). The launch location 1804 is illustrated as position X. The system determines a starting location 1806 for the flight pattern where the survey will begin The starting location for example, is where the UAV will begin obtaining sensor data, such as digital images, describing a surface or ground area being inspected. In the example, the starting location of the survey is represented as position Y 1806. A battery consumption amount is determined by the system for this first segment, from point X to Y. As shown in FIG. 18, the flight pattern is performed in the direction of the arrows. Battery consumption is then determined by the system for the segment from position Y 1806 to position B, and returning to position X 1804. The total estimated battery consumption of the first segment combined with the second segment is evaluated. If a desired total battery consumption is set for 90% battery consumption, but the first and second segments yield an estimated battery consumption of 80%, then the system will perform evaluations for subsequent positions C and D. The total battery consumption from X to point C, and returning to point X may only yield 84% battery consumption. The total battery consumption from point X to point D, and returning to back to point X may yield 88%. The system may select point D then as the return point along the flight pattern as the return location from the flight pattern at point D as it would provide the most use/or battery usage yield to the desired battery consumption of 90%. The system can iterate through serial points along the flight pattern to determine a best or desired return location such that the UAV returns to the launch location at an estimated battery usage. This process provides better predictability as to where the UAV should return. While battery consumption is used in the example, estimated battery charge remaining or battery charge used can be evaluated, as well as other measurement of the batteries usage by the UAV.

Again, in the example, points E, F and G are evaluated for a return location for a battery exchange. The number of points may vary, but for the purposes of the example, only 3 points are discussed. The next return location is then estimated. For the next return location, flight is evaluated starting from point X to point D where the inspection will resume. From point D to point E, and returning to point X, the battery consumption is estimated, and similarly for points F, and G along the flight pattern. In this example, assume from point X to point D, to point F, and returning to point X yields to desired 90% battery consumption. As such, the point F, is selected as the return to the launch location so that the battery may be replaced for the next leg. The process would continue and other points would be evaluated along the flight path to determine if another battery exchange is needed or not.

The selected return locations, in this example, D and F, are evaluated in the flight pattern as a possible return location from the flight pattern. As discussed above, these locations are displayed via the user interface indicating the location where the UAV will begin its return for a battery exchange. As shown in previous figures (e.g., FIG. 10 displaying two battery icons 1010 and 1012 in the flight pattern) an icon or other user affordance may be displayed via a user interface prior to the UAV actually performing the inspection using the flight pattern. The operator is presented with a certain location of where the UAV will return home to land for a battery exchange.

When a new battery is placed in the UAV, the overall battery charge may be identified by the system. The UAV may utilize a smart battery that monitors the charge and/or usage of the battery. For example, a newly inserted battery, may be charged to 100%, or 80% etc. Based level of the battery placed in the UAV, the selected geo-spatial location in the flight pattern of where the UAV will return home to land will necessary change such that the UAV returns to land at the launch location with a predicted or desired battery reserve level. In other words, although the initial flight pattern and locations of return home locations were identified, the estimates may be based on the assumption of a fully charged battery. If the system determines that an installed battery is less than a percentage charge, the system may recalculate the return to land location based on the percentage charge of the installed battery. A lower charge battery would necessary cause the return location to be moved up, or sooner, in the flight pattern to cause the UAV to return home.

The total flight pattern can be evaluated, and the system determines that multiple batteries will be used. As described in other sections, in the user interface displaying the flight pattern, a total number of required batteries to complete the flight pattern/inspection may be presented. This provides information to the operator so that the operation can determine whether the operator has at least a requisite number of charged batteries available to complete the inspection. An assumption can be made by the system that a fresh battery will be used, and be a 100% charged battery. The geo-spatial locations along the flight pattern where the UAV will return to back to the initial launch location may be estimated with the assumption that a fully charged battery will be used. The system may identify two or more locations along the flight path where the UAV will return home to land for a battery exchange. The system may present the flight path in a graphical manner via the user interface of the ground control station, and identify the locations of where the UAV will return home to land when it reaches a particular geo-spatial location or position along the flight path. However, as discussed above, an actual battery level is ideally evaluated to determine the return home to land for the flight pattern. Ideally, this is done for the before the UAV is launched to conduct any part of the flight pattern.

To predict usage or consumption of the battery, a model may be used by the system taking into consideration the particular activity of the UAV along the flight pattern. For example, from a launch location en route to the beginning of inspection leg of an area using sensors on the UAV, the UAV may use less power for that particular segment. In other instances, the UAV for an inspection portion of the flight pattern may use more power. This is due to the UAV using more onboard sensors powered by the battery, such as triggering onboard digital cameras or video cameras, using collision sensors, etc. While the en route portion may use less power since the sensors will not be used during that portion of the pattern. The flight pattern to inspect an area may then be divided into different segment types and portions, in which battery power consumption is modeled differently for that segment type or portion. The estimated battery consumption for the segment type or portions may be totaled or aggregated to determine a more plausible, or likely battery consumption level, for those selected used segments in the calculation. The model may take into consideration the direction and velocity of the wind, and the particular power consumption used by the UAV to counter-act, or adjust for wind conditions.

As the system has determined the number of batteries to be used for the overall flight pattern, the system may provide voice instructions as to the required battery exchanges. For example, the system may provide a voice command such as "UAV returning home for a new battery" when the UAV reaches the pre-determined geo-spatial location for the UAV to return back to the launching location for a battery exchange. The system may after receiving a new battery, may provide a voice command such as "Battery 2 of 3 installed". ("Battery" x of y "installed") where the system can use a counter for the batteries used (x), and the total number of batteries needed (y) to complete the flight pattern as previously determined by the system.

Ambient Temperature Determination

The system may perform real-time or dynamic check lists prior to launching the UAV. While the system provides for manual checks where the operator indicates that a particular task has been performed, the system may also perform dynamic check lists and display information to the operator about a state, mode of the system, or an environmental condition in which the UAV will fly. Environmental or ambient flight conditions are important for safe flight of a UAV. In particular, the ambient temperature has an impact both flight characteristics and electronic component of the UAV and control systems. A device used as a ground control station, such as an iPhone or iPad, or other touch/tablet device has an ideal operation temperature range. Operating the device outside or near the proscribed operational range may cause the device to malfunction, shutdown, cease certain operations, so that the device, for example, may cool down if the device becomes too hot. Additionally, operating a UAV outside of proscribed temperature ranges may also have a detrimental impact on the UAV. Batteries used with UAVs may quickly loose a charge, especially if external fans need to cool down the battery. The system herein may include an operational mode where the system periodically determines the ambient temperature of the environment in which the flight of the UAV will be conducted. For example, the mobile ground control system may be implemented as an application on an iPad, or iPhone, or other mobile device. Onboard sensors of the device, such as temperature sensors may detect the ambient temperature. The system may before allowing flight of the UAV, determine whether the ambient temperature is within a predetermined ambient temperature range. If the external temperature is determined to be outside of the allowable range, then the UAV will not be allowed to launch. Additionally, the device may determine the ambient temperature while the UAV is in flight. If the ambient temperature falls outside of a particular range, then the UAV may be commanded to return to a launch location, or land immediately. Additionally, the system can determine that based on the time of day when a flight will be performed, and with an estimated duration of flight pattern/inspection by the UAV, whether the ambient will fall outside of the allow temperature range. If the predicted or estimated temperature falls outside of the allowable temperature range, then the flight of the UAV may be disallowed by the system.

Additionally, while operating or navigation a UAV with a mobile device, such as an iPad or iPhone, the device while left in direct sunlight can heat up significantly. The system may periodically determine whether the device temperature is near or outside, or predicted to be near or outside of a predetermined operational range. The system may display a warning via the user interface to instruct the operator about the condition, or may cause the UAV to return to a launch location, and in certain instances instruct the UAV to land immediately.

Similar to the determination of the ambient temperature of the device used as a mobile ground control station, the system may monitor the device to determine the remaining battery of the device. If the battery reaches a threshold level, then the UAV may be instructed to return to a launch location or land immediately depending on the level of the battery of the device.

Inspection Area/Flight Pattern Based on Collected Geo-Spatial Locations

Often times a ground control station will use aerial satellite imagery, or base maps, so that an operator can select a location for inspection by a UAV using the based maps. However, this often requires wireless or cellular connectivity by the ground control station or flight planning system to a map or satellite image provide. Situation arise where, based on the location, connectivity is limited or non-existent. As an alternative to, or in combination with the base maps, the ground control station, or UAV system, may be used to create an inspection area on which a flight pattern would be based. The first process includes the system creating a track path around an area by the ground control station, and the second process includes the system creating anchor points by the UAV on which an inspection area is based.

Figure 16A:
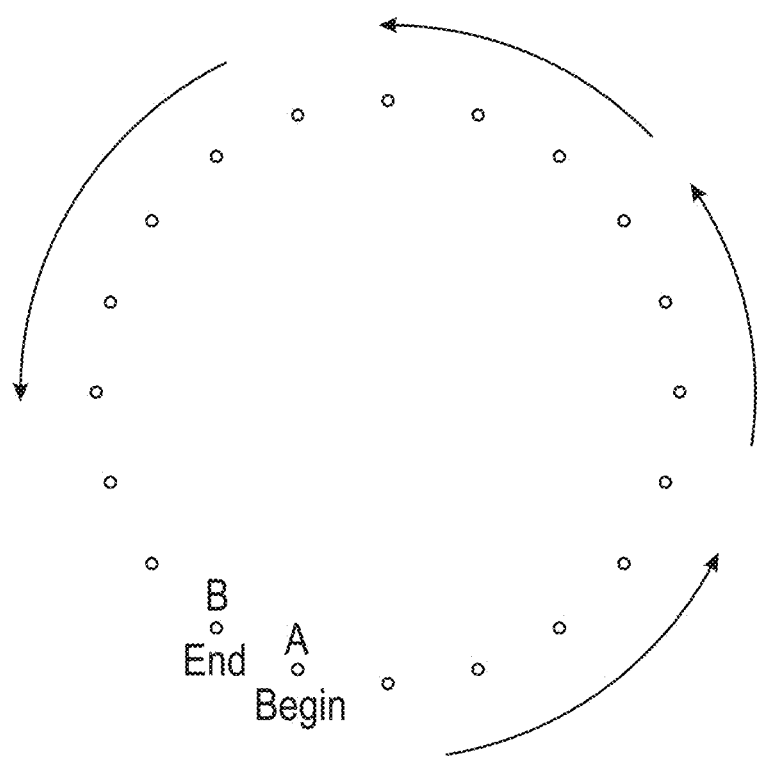
FIG. 16A illustrates a track path with geo-spatial locations obtained by a device.
Figure 16B:
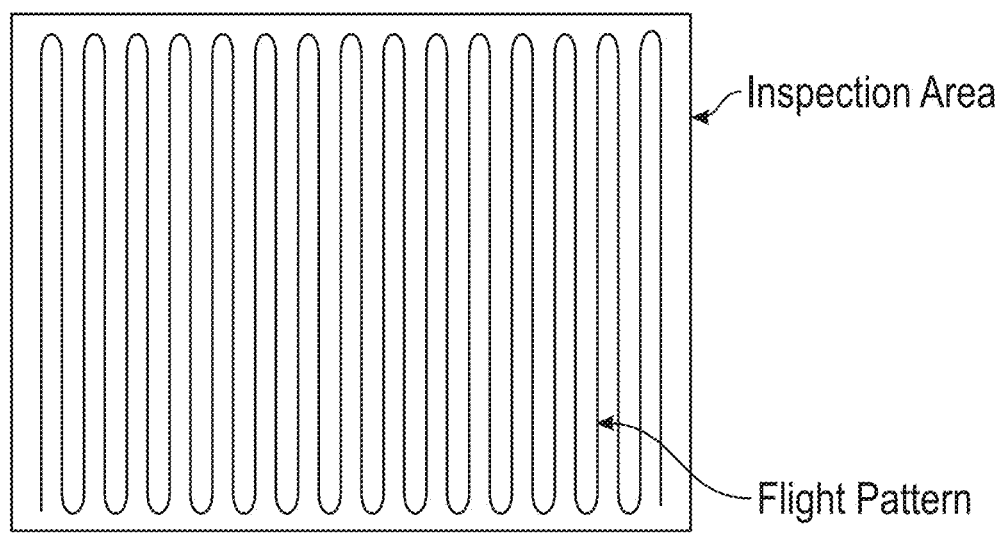
FIG. 16B illustrates a geo-spatial inspection area with a generated flight pattern.

In one embodiment, the system using the device, such as an iPad, iPhone, or a separate GPS (GNSS) collection device and receiving the GPS coordinates (e.g., latitude/longitude/elevation), creates a track path around an area. Referring to FIGS. 16A and 16 B, illustrate a track path with each of the points of FIG. 16A being a geospatial location obtained by the device. The operator of the device carries the device from location A, and walks or drives around an area, and stops at point B. This rough outline of the area to be inspected is than converted to a shape such as the rectangle in FIG. 16B. The shape could of other types, such as a square or circle. However, would include the locations from the track path. The system would create a geo-rectified shape, such that the edges of the shape have a corresponding geo-referenced location. A flight pattern then can be generated by the system to fly a pattern within the inspection area to capture aerial data describing the ground, surface, or structures found within the inspection area. The device is place in a mode to begin collecting coordinates. An operator carries the device around an area. The device may be placed in a collection mode, and capture location "bread-crumbs" or geo-spatial positions periodically as the device is carried around the area. While ideally, the positions are GPS or GNSS positions, the system may also determine positions based on inertial navigation systems or process enabled on the device. The system then evaluates the path created by the collected geo-spatial positions, and creates an inspection area based on the evaluated path. For example, the system may determine a perimeter based on the collected positions for an inspection area. The collected positions may be referred to as track path geo-spatial positions.

While the device is being carried, the system may provide via a user input through a user interface of the device, an indication of obstacles at the then current location and/or position of the device. A minimum altitude for clearance of the obstacle may be entered into, and received by the system. This minimum altitude, or clearance distance, may be used by the system when creating a flight pattern, where for that particular location, the UAV while conducting the flight pattern, flies at an altitude sufficient to clear the obstacle.

The track path geo-spatial positions may be normalized, or converted into linear segments by the system. For example, while the device collects positions, the positions may not be necessarily in a straight line, due to the operator movements carrying the device, or due to inaccuracies of the GPS receiver, or satellite visibility by the device. The system may determine a polygonal shape based on the collected positions to be used for the inspection area.

While a base-map may not be present, the interface may still provide a display of the generated inspection area based on the track path geospatial positions. The system may allow for correction and modification of the polygonal shape of the area to be inspected by the UAV. The system may then receive an input from an operator to generate a flight pattern to inspect the area within or about the perimeter created by the system. Alternatively, the system may generate an inspection area, and flight pattern automatically, after the device is placed outside of the collection mode.

Additionally, an operator may take pictures of objects utilizing the device. For example, if walking around a structure, the system allows for user input, to capture images using the device. Based on the geospatial position of where the image was taken, and if the device is taken to a position near the structure, and a geo-spatial position observed by the device, an estimate of the height of the structure may be calculated. This height of the structure then can be used as a minimum height above which a UAV would have to fly over the structure to avoid collision with the structure. Additionally, an offset or buffer distance to the determined height of the structured may be added for a minimum height to provide for additional clearance over the structure while the UAV is performing a flight pattern, and/or inspecting the structure.

Additionally, the system may measure a distance from the structure to a location distant from the structure. The operator may point hold the device level, and aim a forward facing camera at the height point of the structure. The system can then determine based on angle from the horizon to the point aimed at the highest point of the structure, the overall height of the structure at the measured point. Thus obtaining a horizontal distance from the structure, and an angle of elevation determined by the device, a height of the structure can be determined. The determined height then can be used as described above as a minimum height (and/or with a pre-determined buffer) over which the UAV should fly. The minimum height may be used in determining a flight pattern over the structure.

In another embodiment, the UAV may be flown to obtain aerial "anchor points" for an inspection area. The system allows flight of the UAV, this may be done manually for example. A user interface is provided that allows the UAV to record a then current geo-spatial position. The UAV is flown to another geo-spatial position, which is recorded. These two points are sufficient to create a base line or an edge of a perimeter of an inspection area. However, the system allows collection of more points, which allow additional polygonal points of an inspection area. For example, if three points are collected, then a triangular polygon may be generated based on the three points. If four geo-spatial points are collected, then a rectangular polygon may be generated for use as an inspection area.

The anchor points may be displayed via a user interface, along with and estimated length between anchor points. The system may initiate a survey pattern using 2 or more anchor points to form the boundaries of the survey for example. If the UAV system collects 3 anchor points, a rectangular inspection pattern may be based off of the anchor points. For example, the system will determine a first line between the first and second anchor point, and will determine a second line between the second and third anchor point. These two lines will form two edges of a polygon-shaped inspection area. The two lines can be adjusted to form a right angle by the system. Opposite edges of the inspection area then can be based on the two lines already determined. This provides a way to create an inspection area using the system. A flight pattern then can be based on the created inspection area. The lowest or highest altitude of a captured anchor point can be used to set the minimum inspection altitude for the flight pattern. For example, an operator may navigate the UAV to 3 areas, and obtain geo-spatial locations. Each of these locations would include a GPS or GNSS coordinate which would include a latitude/longitude value, and also an altitude. The system would evaluate the obtain geo-spatial positions, and would use, for example, the highest altitude of the three obtained anchor points to use as a minimum flight altitude while conducting the flight pattern.

While the UAV is navigated to the different locations to set the anchor points, the UAV may conduct an aerial inspection, and obtain sensor data describing the location under its flight path. This would optimize the inspection by obtaining possible usable aerial data, such that the flight pattern can be adjusted such that the area does not have to flown over again to obtain data.

GCS Unit—Tripod Mode, Drop Detection

During an automated flight of a UAV for a predetermined flight pattern, an operator of the UAV may initiate the flight, and then wait patiently for the UAV to complete the autonomous flight pattern or inspection. In certain situation, the ground control station for control of the UAV may be monitored to ensure that the ground control station is physically being held by the operator and not placed on a surface while the UAV completes the flight pattern, or that the operator accidentally dropped the ground control station.

The ground control station such an iPad or iPhone, may be used to control the UAV. The ground control station may have accelerometers, gyroscopes or other onboard sensors that may detect a velocity movement, impact or shift of the device. While control a UAV for an autonomous flight, the device may monitor the onboard sensors and determine if a threshold level of movement is occurring with the device. For example, if one holds the device in one's hands then the device will detect slight shifts or movement of the device. However, if the device is left on a surface, then the device can detect that the device is stationary. The ground control station system may periodically detect that the device is meeting a predetermined threshold movement over a period of time. If the system detects that the device has not moved for the requisite period of time, then the ground control station may initiate a command to the UAV causing the UAV to hold. The ground control station may display via a user interface of the device, a message to the operator asking the operator to resume the autonomous flight of the UAV. The ground control station may utilize a timer in which after the command is initiated, if the operator does not respond to the request, then the UAV is instructed to return home to a predetermined landing location, or other location.

The ground control station may be configurable allowing an operator to place the ground control station in a mode where the ground control station does not perform the non-movement detection. For example, there may instances where the operator may place the ground control station device on a tripod. The ground control station software may require an action to be taken by the operator to affirmatively disable the detection process. As an example, the system may have to be put in a mode, such as a tripod mode, to disable the detection process.

Another situation that may occur is that the operator while holding the ground control station device, or if the ground control station device is place on a tripod, the operator could drop the ground control station device, or that the tripod could tip over. The ground control station can detect that device has incurred a particular impact by evaluating the sensor data of the accelerometer and/or the gyroscopes. If a threshold value has been met, the ground control station may determine that the device as received an impact, and the assumption can be made that the device has been dropped. In such occurs, then the ground control station may provide a command to the UAV to land as described above, or hold the UAV in its then current position in flight (if for example, a multi-rotor UAV), and provide a prompt or user interface message requesting that the operator provide some input to resume the flight. This drop detection process would be applicable to both UAVs that are flying according to a predetermined fight pattern, and UAVs that are being flown via controls using the ground control station.

The following illustrates an example of how the system would work. An operator is navigating an unmanned aerial vehicle with a mobile ground control station software using an Apple iPad device for automated fight of the UAV according to a flight pattern. The operator of the device may accidentally drop the device, or leave the device on a trunk of a vehicle, or on a bench. Once the device detects either of these events occurring (a drop event, a non-movement over a period of time event), then the mobile GCS would automatically instruct the UAV to hold in position. The mobile GCS would present via the user interface an option for the operator to continue or resume the flight. If the option is selected the mobile GCS would instruct the UAV to resume the autonomous flight pattern. If a certain time period elapses, say 30 seconds without a response, then the UAV would be instructed to automatically return and land. Optionally, if the ground control station detects a non-movement event, the UAV would instruct the UAV to hold.

There may be instances where an operator of the mobile GCS holds the device in their hand in a steady fashion. Doing so may cause the mobile GCS to determine that it is not moving, and instruct the UAV to hold in position, or land based on the configuration of the mobile GCS. However, in one embodiment, the operator could shake the device, which would cause the device to generate sufficient movement of the device. In response to the detected shake event, based on the accelerometer threshold axis valued being met or exceed, the device then would determine that the operator has control of the device. If the threshold value is detected, then in response, the mobile GCS may automatically instruct the UAV to continue with the flight pattern from the hold position. If the mobile GCS is configured to cause the UAV to return home, shaking the mobile GCS would cause the UAV to return back to its previous aerial location, and resume the automated flight pattern.

User Interface for Real-Time Control of UAV.

Figure 17:
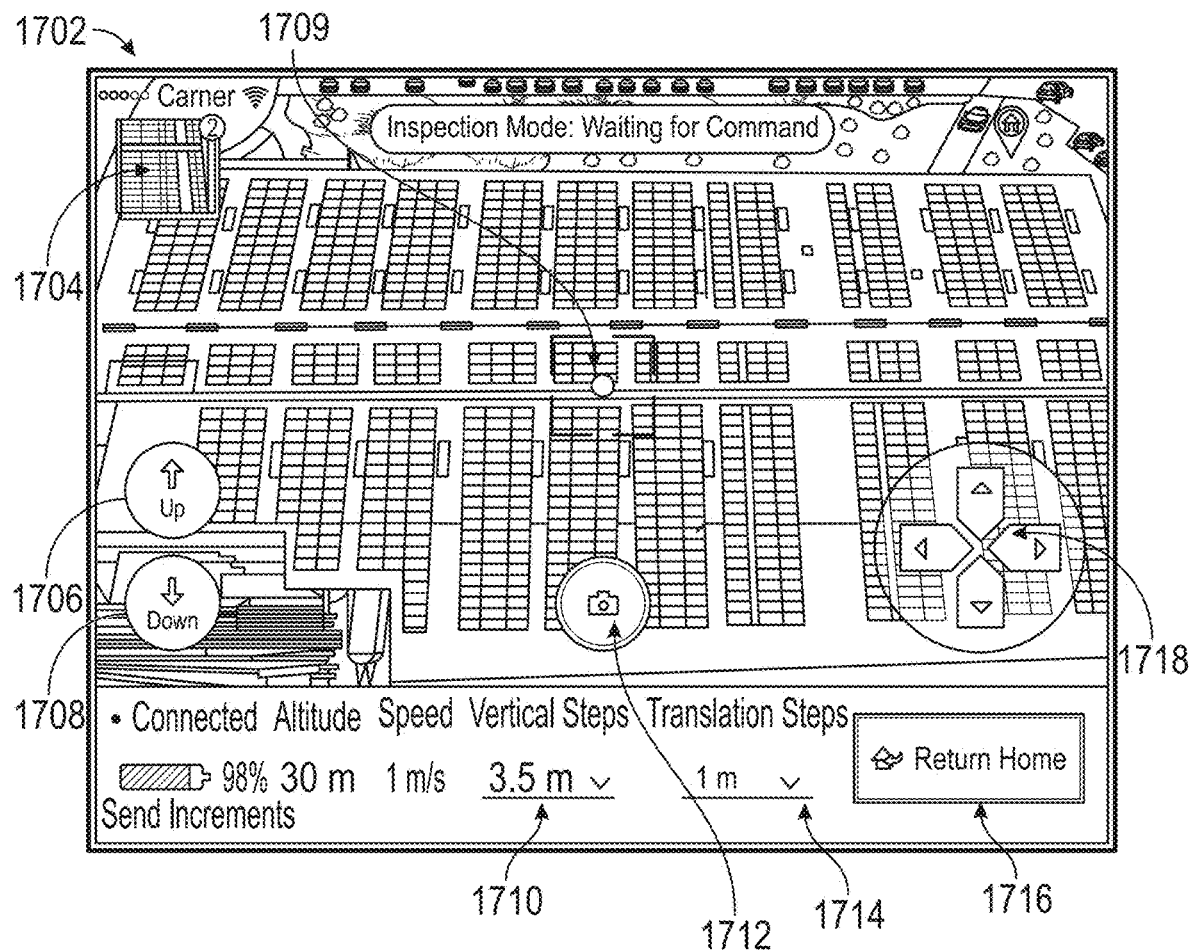
FIG. 17 illustrates an example user interface for control of an unmanned aerial vehicle.

In one embodiment of the ground control system, the system presents a user interface similar to the interface 1702 depicted in FIG. 17. The user interface 1702 provides graphical movement controls (1706, 1708, 1718) to command operational movements of the UAV in the X/Y/Z directions, such as a multi-rotor UAV. In this embodiment, a pre-determined flight pattern is not needed for an inspection of a structure. Rather the interface allows 1702 for user inputs to command the UAV in certain directions according to the selected displayed control. These controls allow for stepped-distance movement of the UAV in a particular direction. These controls allow an operator to move the UAV into a particular position to inspect an object. While the UAV is a position the UAV may take a picture of a structure, roof or an area, when the operator selects the camera icon shown in the display. A thumbnail image 1704 is then displayed in the upper left corner with a counter showing the number of images selected. The user interface 1702 may show a region of what area of image will be captured from the display. As shown, in the display there is a bounding box 1709 with four corners and a circle in the middle. This presents the area of image that will be obtained when the user selects the camera icon. In the particular embodiment show, the entire viewing area is not captured, but only the portion of the image displayed in the bounding box. Additionally, if the UAV has a gimbaled camera, the camera may be control with another graphical control (not shown), such as a graphical toggle control allow the gimbaled camera to be oriented in various directions. The user interface 1702 may also depict a percentage battery remaining, an altitude of the UAV, and other information about the UAV operation or state. Additionally, the user interface 1702 may include a return home icon or button 1716, and when activated would cause the UAV to return to a launch location or a predetermined landing location.

For example, the user interface 1702 displays real-time imagery, such as a received video stream from the UAV. In the exemplary figure, a structure with solar panels is displayed. As depicted the user interface include controls 1718 on the right of the screen, and controls on the left of the screen 1706, 1708. While not shown, a configuration mode allows a user to select alternative placement of the controls to a position suitable to the operator. As an example, the controls shown could be swapped such that the "up/down" vertical controls are positioned to the right, and the horizontal controls are positioned on the left side of the screen.

In this user interface, the up and down controls 1706, 1708 direct the UAV to move a distance in the vertical direction, either up or down. For example, if an operator selects/touches/taps the "up" control 1706 the UAV will be commanded to move a distance vertically upward. For each of the control the particular distance moved can be configured so the UAV moves in the selected direction to a predetermined distance, such as 1 meter, 3 meters, 6 meters, etc. Should the UAV have collision detection/avoidance sensors, the UAV will try to move in the determined distance, but the UAV flight control systems will stop the UAV from moving the full distance due to the detected obstacle in the direction of the selected movement. In the exemplary display, the interface provides for a selection of Vertical steps 1710, and Translation steps 1714. The Vertical steps allow the receipt of a selection or user input of an operator to set a predetermined movement distance for the "up" and "down" control in the Z-axis. The Translation steps allow the system to receive a selection or user input to set movement of the control for the right/left/forward/back controls in the X/Y-axis for horizontal movement of the UAV. In the example, the UAV is set to move 3.5 meters for a vertical step in the up or down direction. And the UAV is set to move 1 meter in a selected horizontal direction.

In another embodiment, the distance moved by UAV for a selected control can be set at a variable distance, or a ratio of a determined distance to a detected object. For example, the UAV may have distance detection sensors that provide a measured distance to an object, for example LiDAR, SONAR, etc. The UAV system may compute a distance from the UAV to the detected object. The movement controls may be configured to allow for different distances to be moved by the UAV based on a determined distance from an object. For example, the UAV may detect that an object is 20 meters horizontally away from the UAV. If a movement control is selected to move the UAV in the direction of the object, the UAV may for example move 10 meters toward the object. Now that the UAV is 10 meters from the object, the same movement control may when selected only move the UAV toward the object, for example only 5 meters. Now that the UAV is 5 meters from the object, the same movement control may only move the UAV 1 meter towards the object.

As an example, the following Table 1 shows a movement control matrix.

TABLE 1

| Control | 20 meter or greater distance to detected object | >10 meters and <20 meters to detected object | >1 meter and <10 meters to detected object | Disable Control Movement |
|---|---|---|---|---|
| Move Upward (+Z axis) | 10 meters | 5 meters | 1 meter | If <1.5 meter |
| Move Down (−Z axis) | 10 meters | 5 meters | 1 meter | If <1.5 meter |
| Move Right (+X axis) | 10 meters | 5 meters | 1 meter | If <1.5 meter |
| Move Forward (+Y axis) | 10 meters | 5 meters | 1 meter | If <1.5 meter |
| Move Back (−Y axis) | 10 meters | 5 meters | 1 meter | If <1.5 meter |
| Move Left (−X axis) | 10 meters | 5 meters | 1 meter | If <1.5 meter |

The table is used to illustrate the movement control based on a detected distance from an object. The distance allowed for the UAV to move in a direction may be based on preset or configured distance. The distance allowed for the UAV to move in a direction may based on logical if/then rules (such as if the UAV is within a measured distance from an object in the direction of the selected movement, then move the UAV x meters in the direction). The distance allowed for the UAV to move in a direction may be based on a ratio of a determined distance (such as when the UAV is 20 meters, then move toward the object based on a ratio (e.g., ½) of the measured distance, which would be 10 meters. The distance allowed from the UAV to move in a direction may be based a matrix, or be programmatically configured to move a preset or variable distance based on a detected distance from the object. As an example, in the table the Move Right control illustrates that the UAV will move a particular distance right based on an x/y/z axis (as shown) where right is a positive x-axis movement, and Move Left is a movement in a negative x-axis. If, for example, the Move Forward control is selected, and if the UAV is 20 meters or greater from the detected object, then the UAV will move a full 10 meters forward toward the object. If, for example, the Move Forward control is selected, and the UAV is greater than 10 meters, but less than 5 meters from the detected object, the UAV would only move 5 meters toward the objects. And lastly, if the UAV determines that the UAV is less than 5 meters from an object in the forward direction, and the Move Forward control is selected, then the UAV will only move 1 meter, and would continue to only move 1 meter in the Forward direction.

The UAV may be prevented from moving toward the object if a predetermined threshold distance value is met, or will be met if the UAV moves toward the object. The system may prevent the UAV from moving toward an object based on the rules or criteria, etc. For example, as shown in the table column "Disable Control Movement", the UAV would be prevented from moving toward the object if the UAV has determined that the distance to the object is less than 1.5 meters. In one embodiment, the graphical movement control may be highlighted in a color, (such as red or yellow) to show that the movement is not allowed in that direction Additionally, the graphical movement control may be disabled, or shown in a gray state, or some other visual state to represent that the UAV may not be allowed to move in the direction of the control. For example, if the UAV detects that an object in front of the UAV (i.e., in the +Y direction) is less than 1.5 meters, then the UAV graphical movement control (may be depicted in a different state) representing that the particular control will not move the UAV in the usual direction of the graphical movement control.

Optionally, the user interface may depict numeric values on, or adjacent to the particular control indicating the distance to be move by the control. For example, the upward movement control may display 10 m to indicate that if selected, the upward movement control would move the UAV in the +Z axis 10 m if selected. The value display from the graphical movement control would be based on the allowable distance to be moved in the selected direction as discussed above.

Additionally, the user interface may include a control slider, or other user affordance to indicate the granularity of movement. Alternatively, this may be configured via a configuration function or display of the system. For example, the control slider may have a finer setting on one side of the slider, and a coarser setting on the other side of the slider. Based on the position of the slider, the allowed movement in any direction could be set for a longer distance for the coarser setting, and a shorter distance for a finer setting. With the slider the distance could be a percentage of a predetermined value, or a finite distance. Alternatively, a toggle could be used for either one setting or the other. For example, a coarse setting could be 20 meters, while a finer setting could be 10 meters. This would allow the operator to move the UAV a farther or shorter distance for each selection of a particular graphical movement control. This is especially useful where the control UAV may not have distance measuring sensors. Or even if equipped with distance measuring sensors, allow the operator to move the UAV in areas where there are no obstacles in an area. However, the system may be configured such that the rules of movement toward a particular object would apply. As an example, if a coarse setting is selected, and the maximum distance moved is 20 meters, then the UAV would move 20 meters in the selected distance. However, if the system detects an object in the desired movement direction, the system would use the applicable distance movement rules for the UAV as discussed above.

While the movement controls are initiated the system may record each of the commands, and the particular direction, and the distance the UAV is command to move. This allows the system to back track along the particular path flown. Embodiments of the system may use geo-spatial positions, such as flown GPS coordinates to back track along a particular path. However, the recording the stepped movements of the UAV in particular directions, for a particular distance, allows the system to back track in non-GPS or occluded GPS environments. The system can use the magnetometer or other non-GPS heading systems of the UAV to determine its direction in reference to the front of the UAV. For example, the system may receive input controls cause the system to move forward 10 meters, down 5 meters, right 3 meters, and forward 5 meters. The directionality and distance of the UAV moved for the respective commands are stored in memory, such as cache, or written to a log in memory, or to a storage medium. The system may provide various user interfaces to allow the UAV to return. In especially, complex environment with many surrounding obstacles, the system allows the UAV to return all the back to the launch location, or allow incremental steps to back track. In the example above, the last command was move forward 5 meters. To back track, the system would receive a command to incrementally move back along the path of travel, or return home. In response to receive the command, the UAV would move back 5 meters, then it would move left 3 meters, up 5 meters, and so forth. Especially in occluded GPS environments where satellite reception is degraded or minimized, the UAV may use distance measuring sensors, or visual-based odometry systems, and/or other inertial measurement systems to determine the distance to move. As displayed in the user interface of FIG. 17, an icon showing a house (displayed with text Return Home) may be selected. In one mode or embodiment, selecting or tapping this control will cause the UAV to return to a launching location, by "play back" in reverse order the steps commands that were record. The system, in reverse chronological order initiates the step commands, that were stored in memory, thus causing the UAV to return home by back tracking from its then current location along a path to where the UAV was launched.

Comments and Real-Time Annotation.

In one embodiment, a shape may be selected or drawn on the imagery. In other embodiments, the user interface may display a tool bar, or other icons that perform a function on the user interface. In another embodiment, a comment may be placed at a location of the imagery. The user interfaces allow annotations to be placed on the imagery in real time, and as the drone moves around the area, the annotations stick to the imagery. The annotations may be captured and then may be provided to a separate system from the ground control station for subsequent use and processing.

While displaying imagery (such as a video feed) from an onboard camera or video camera fixed to the UAV, the operator may interact with the imagery and annotate the image with comments, shapes, polygons, etc. on the imagery. For example, the user interface 1702 may be operating in a mode that provides for touch input via the interface over the display video or imagery. The user interface allows annotations, comments, text, shapes, icons to be placed on the imagery in real time, and as the drone moves around the area and video images are displayed, the annotations stick to the imagery. This may be associated to geo-spatial locations, or to image pixels, and the images and the annotations may be provided to a separate system for processing or storage.

The user interface allows for tracing, or drawing of objects or shapes via the display. Computer vision processing or image recognition processing may identify a shape or type of an object, and snap the placed or drawn object to a recognized object displayed in the image.

Additionally, the user interface may receive a tap or selection on a portion of a displayed video feed, or image. In one embodiment, the UAV will then move to the location selected via the user interface. In another embodiment, the system will determine maneuvers to move the UAV to the selected position, and will highlight the respective controls (e.g., 1706, 1708, the individual controls of control 1718). to indicate that the operator is to select the control to move the UAV. This allows a predictive movement to a particular area from the current location to the identified/destination location, but allow the operator of the UAV to select the highlighted user interface control to move the UAV in a step-wise, but partially manually controlled manner. For example, an operator selects a location in an image. The respective controls would be highlighted in a serial manner to indicate which controls should be selected to move the UAV to the selected destination location. For example, the operator selects a location in the image, the move right control may be highlighted, which indicates that the operator is to select that control, in response to the selection, the UAV moves in a predetermined in the right direction. Next the move forward control is highlighted (or graphically indicated in some manner to be selected), and in response to the selection, the UAV move forward in a predetermined distance. The predetermined distance may be based on a calculated distance to move to the location in the least amount of steps possible, and/or use distance measuring sensors to determine a distance to the location. Additionally, GPS/geo-spatial location coordinates can be obtained or derived for the destination location, and for the then current geo-spatial location of the UAV. The system may then determine the step-movements of the UAV to move to that location. In one embodiment, the UAV may autonomously move from the then current location to the destination location based on the determined step-wise movements. The system may record/store the step movements as discussed above, thus allowing the UAV to back track to a previous location.

Additionally, the user interface may receive different gestures to indicate an activity to be performed by the UAV at the location. For example, a double tap on the user interface may cause the system to move the UAV from the then current location, position above the physical structure/ or location where the user interface was selected (as correlated to a real-world geo-spatial location), and then obtain sensor data of the structure, while the UAV is positioned at the selected location.

As discussed previously, annotations or objects may be placed on images. In the case of a video-stream, the images displayed would be constantly changing. The system may geo-rectify the frames of the video feed, and the attach the annotation or object to a geo-spatial coordinate. This allows for the UAV to move to a different location, and when the video displays a previous location where the object was attached, then the object will come into view. For example, a square is placed in the far right of an image while the UAV is hovering over a structure. The frame of an image is geo-rectified from a pixel coordinate system, and a geospatial location of a pixel is identified. The object placed on the image is tied or associated to the geospatial location. As the the UAV is move to the right, and the video of the structure pans right, the object placed or attached to the geo-spatial position will move to the left. If the UAV continues to the right, eventually the the object will pan left off of the screen. Similarly, the object can be associated to an altitude level, or attached to a pixel reference in the images so that as the video feed changes while the UAV moves up or down, the size of the attached object or shape will increase or decrease in size proportionately to the image.

Later after an inspection is performed, the location of the objects (geo-spatial locations) may be sent to another system. Additionally, any video that is being captured, can be placed back with the respective objects that were over-laid in the particular positions in the video stream. As an example, as video is recorded of a rooftop of a structure, an operator may place a rectangle on a skylight. For example, this may be done at time 3:30 minutes/secs into the video. At this time the operator would place the comment box, icon or other object via the user interface onto the skylight displayed in the video Assume that the skylight may have been displayed at time 1:30 minutes/sec of the video as well. Later when the video is replayed, the object place at time 3:30 minutes/secs, would also be show at time 1:30 in the video. As the video is replayed, the frames of the video can be geo-rectified, and the previous objects placed on the video images, then can be associated with a position as to where the object was placed in the image.

While the above discusses attaching the objects/comments to frames of the video, the same could be done with singular digital images captured by the system. For example, the UAV may capture a first image of the skylight and display the digital image via the user interface. The UAV may capture a second image of the skylight and display the digital image via the user interface. An operator may place a comment or object on the skylight of the second displayed digital image. A respective geo-spatial location from the pixel location of the image is determined by the system. Later then, when the first image (or any other image depicting the skylight), the comment or object placed on the second image will be placed at the same or similar location, and displayed in the first image.

Object Recognition

In one embodiment, the user interfaces described herein allow for object detection. While the UAV obtains video imagery or digital images, the system displays the imagery via the user interface. The user interface provides for a receipt of a selection of a portion of a displayed image, for example by a user placing a predetermined object shape, such as a circle or square on the image, or the user interface allows for a user to draw a shape around a portion of the image. The pixels found within perimeter of the placed shape or object, are extracted by the system as a sub-image. The sub-image is then analyzed by the system, or sent to a separate system, to determine or identify through a visual classifier or other trained machine learning database or system, the type or class of the object. The sub-image is stored by the system, and is associated to a particular frame of the video, or of a digital image as the case may be. When the system detects the type of object, name of the object type may be displayed via the user interface. For example, if a user places a perimeter around the skylight discussed above, the user interface may display textual information of the type of object, a "skylight", and other associated information for the particular object detected.

User Interface for Real-Time Control of UAV.

Figure 19A:
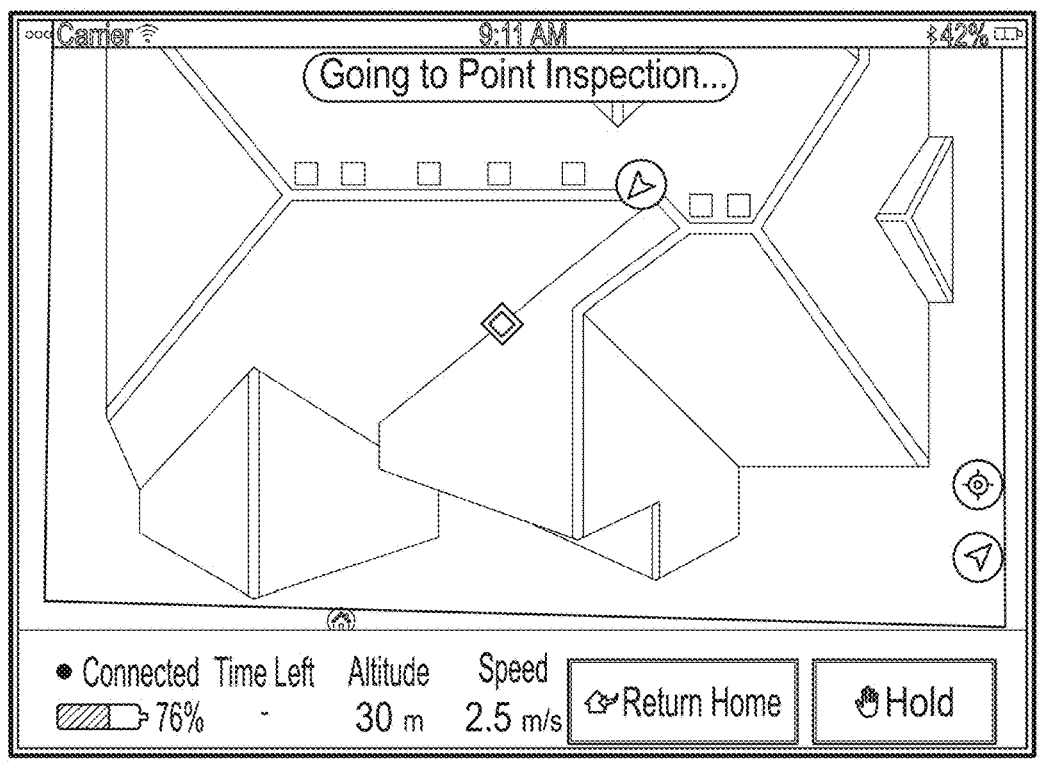
FIG. 19A illustrates an example user interface for control of an unmanned aerial vehicle.

In another embodiment of the ground control system, the system presents a user interface 1900 depicted in FIGS. 19B-19F. The depicted interface comprises user interface controls to maneuver a UAV above an inspection area, and obtain or collect sensor data describing the inspection area. In this embodiment, a pre-determined flight pattern is not needed for an inspection of a structure. Although, the interface may be used in conjunction with a predetermined flight pattern. For example, FIG. 19A depicts the system switching from an autonomous inspection mode to a point inspection mode where the operator has manual control over the UAV to perform an inspection. The interface 1900 allows for user inputs to command the UAV in certain directions according to the received inputs via the user interface. The user interface may receive input gestures, such as through a device with a touch interface, and those input gestures are translated or correlated by the system to actions that will be taken by the UAV. While the UAV is navigating above an area, such as a rooftop of a structure, imagery of the area is captured by the UAV, and is presented via the user interface to the operator. This real-time imagery provides the operator visual information about the inspection area. The interface 1900 may provide a user interface control 1906 to cause the UAV to return home to a predetermined landing location, such as the original take-off location. The geo-spatial coordinates of the take-off location are stored by the system, and are referred to when the control 1906 is selected.

The annotation functionality, and object detection functionality, discussed previously in regards to FIG. 17, is also applicable to the user interface of FIGS. 19B-19F.

The system displays, via a user interface 1900, real-time images obtained by the UAV while the UAV is in-flight. The user interface includes a vertical control portion, and a horizontal control portion. The vertical control portion comprises a graphical user interface control that controls a vertical ascent/descent of the UAV. The horizontal control portion comprises a user interface control that controls a horizontal movement of the UAV. In response to input via the user interface, moving the vertical graphical control causes or instructs the UAV to maneuver in a vertical direction. In response to input via the user interface, moving the horizontal graphical control causes or instructs the UAV to maneuver in a horizontal direction. In one embodiment, a travel to waypoint is calculated by the system based on the received input, and the UAV is instructed to navigate to the waypoint. While the vertical control portion is depicted on the left side of the user interface, the vertical control portion may be configured to display on the right side of the user interface. The system may store profile information for the user of the system, and display the vertical control portion on the user interface based on the user's profile.

UAV Vertical User Interface Control

The user interface 1900 has a user interface control 1902 that allows for vertical control of the UAV. In the exemplary interface, the user interface control is a slide-able control 1902 that may be operated via a touch interface of the device. For example, an operator may touch or select the control, and move or slide the control in an upward or downward fashion along a linear axis. The user interface 1900 displays a height or altitude gradient proximate to the control 1902. This gradient may be displayed in various units of measure, such as feet or meters. The displayed units of measure may be changed, for example, in a configuration section of the system. Also, the unit of measure may be automatically selected by the system based on the location of use of the system. The system can determine its geo-spatial position, and determine the country in which the system is being utilized. Based on the identified country in which the system is being used, the unit of measure would be selected, and presented as the unit of measure, for example, imperial units of measure in the United States or the United Kingdom, or metric units of measure in Japan or Germany.

In one embodiment, the vertical control portion may be integral to the horizontal control portion. For example, the user may select or press and hold on the user interface control 1902. In response, a vertical control slider is presented which displays a height gradient, similar to the control 1902 as previously discussed. The user may move the slider control up or down to cause the UAV to vertically ascend or descend. When the user releases the slider, the UAV will move to the new altitude, and the vertical control slider may be displayed momentarily, and then removed from the user interface. Another way to describe, this embodiment is that the vertical control is a pop-up control, and displays when the horizontal control is selected.

Figure 19B:
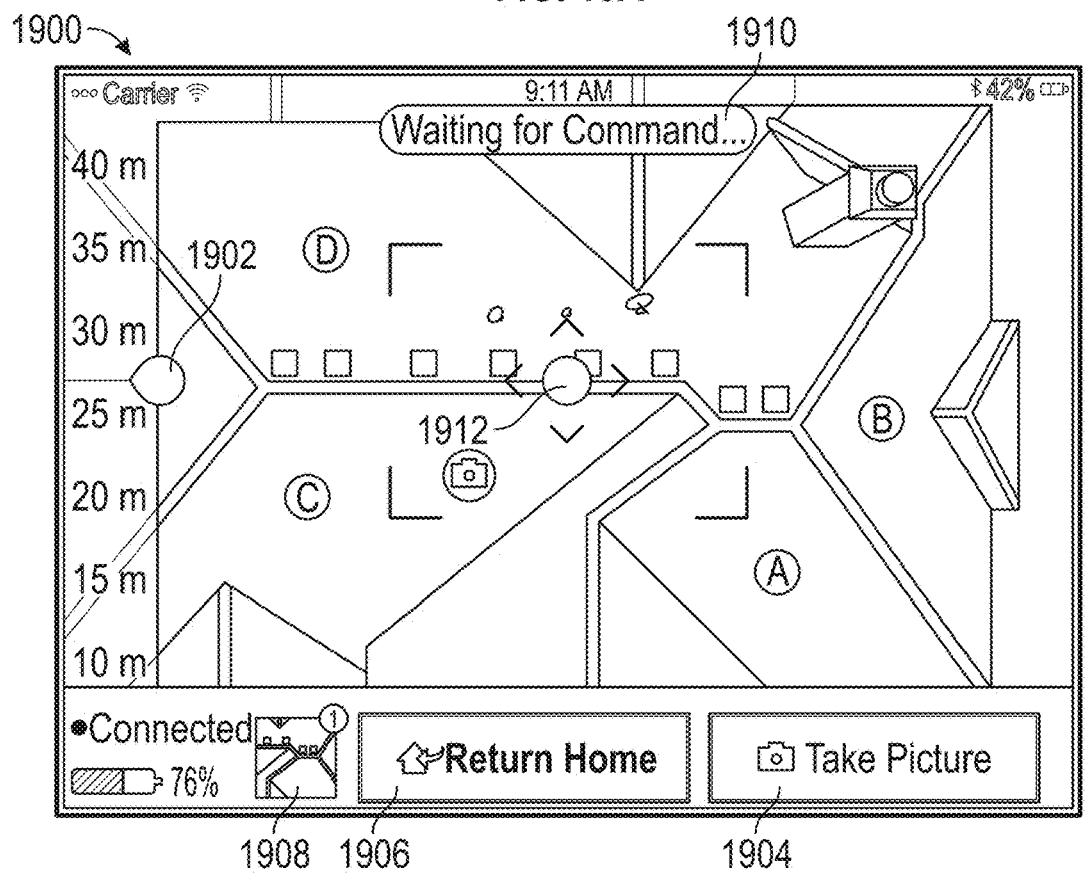
FIG. 19B illustrates an example user interface for control of an unmanned aerial vehicle.
Figure 19C:
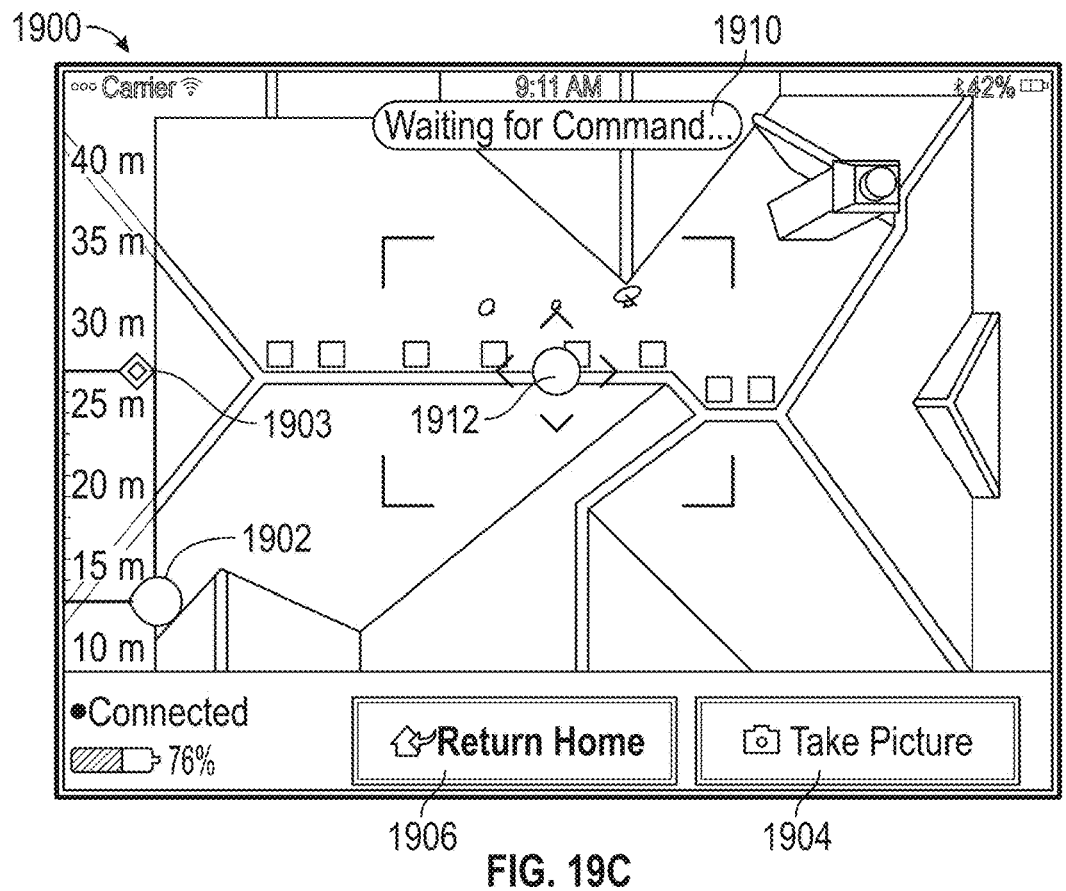
FIG. 19C illustrates an example user interface for control of an unmanned aerial vehicle.

The current altitude of the UAV may be determined by onboard systems of the UAV such as GNNS receivers, and/or barometric pressure sensors. The altitude of the UAV is obtained by the device, and an indication of the altitude of the UAV may be presented on the gradient. For example, FIG. 19C illustrates a graphical indication 1903 of the UAV. The user interface control 1902 is move from the current altitude 1903 to a desired altitude, which in the example would move the UAV from about 27 meters to 14 meters above the rooftop. When the user moves the control 1902 to a new position, then the UAV is instructed to navigate to the new altitude.

Figure 19D:
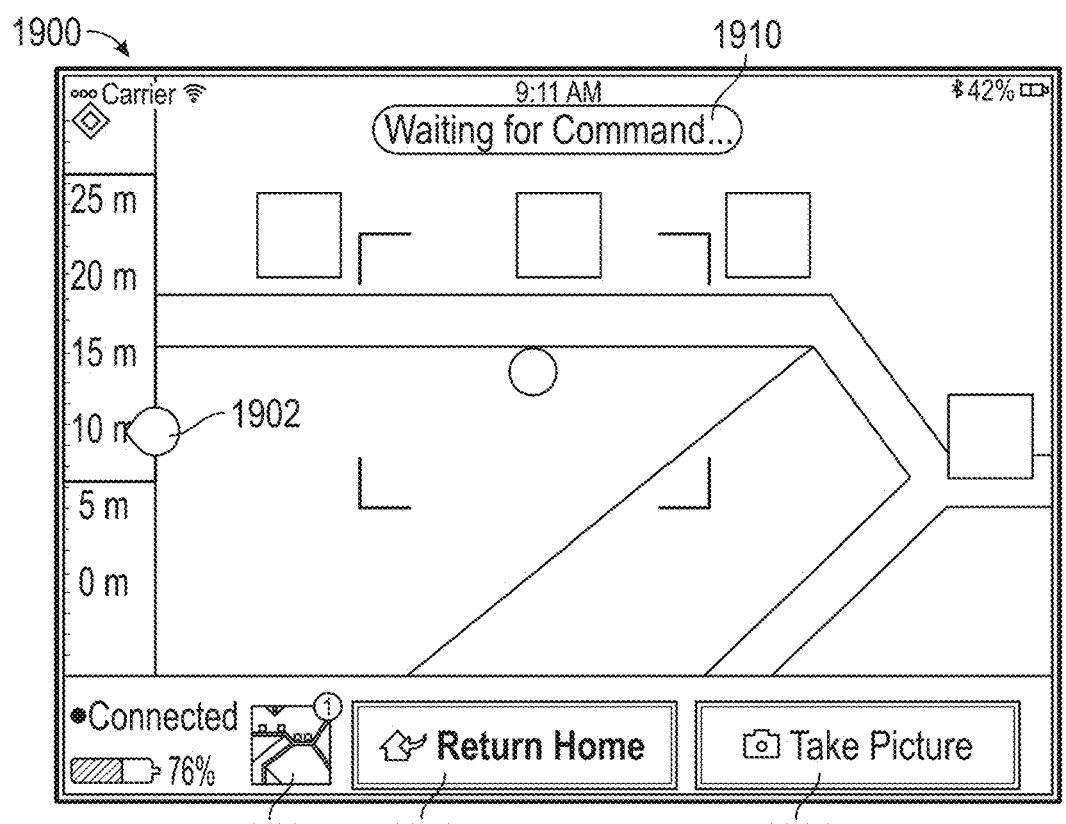
FIG. 19D illustrates an example user interface for control of an unmanned aerial vehicle.

If the UAV is configured with distance sensors, such as SONAR, LIDAR, or other distance measuring sensors, the user interface 1900 as shown in FIG. 19D, may also display in the height or altitude gradient, an indication of proximity to a surface. The indication of the UAV proximity to the surface would identify the determined distance to the surface. In the representative example, a graduated zone indicates a detected proximity to a surface. The solid red section of the user interface indicates a height or altitude below which the UAV can not fly. In other words, the detected surface of the structure begins at the height solid portion of the graduated zone. A semi-transparent area of the zone, a buffer zone, indicates a possible impact area, or do not fly below zone. This buffer zone provides a space buffer an actual height of the rooftop and an aerial position of the UAV.

Figure 19E:
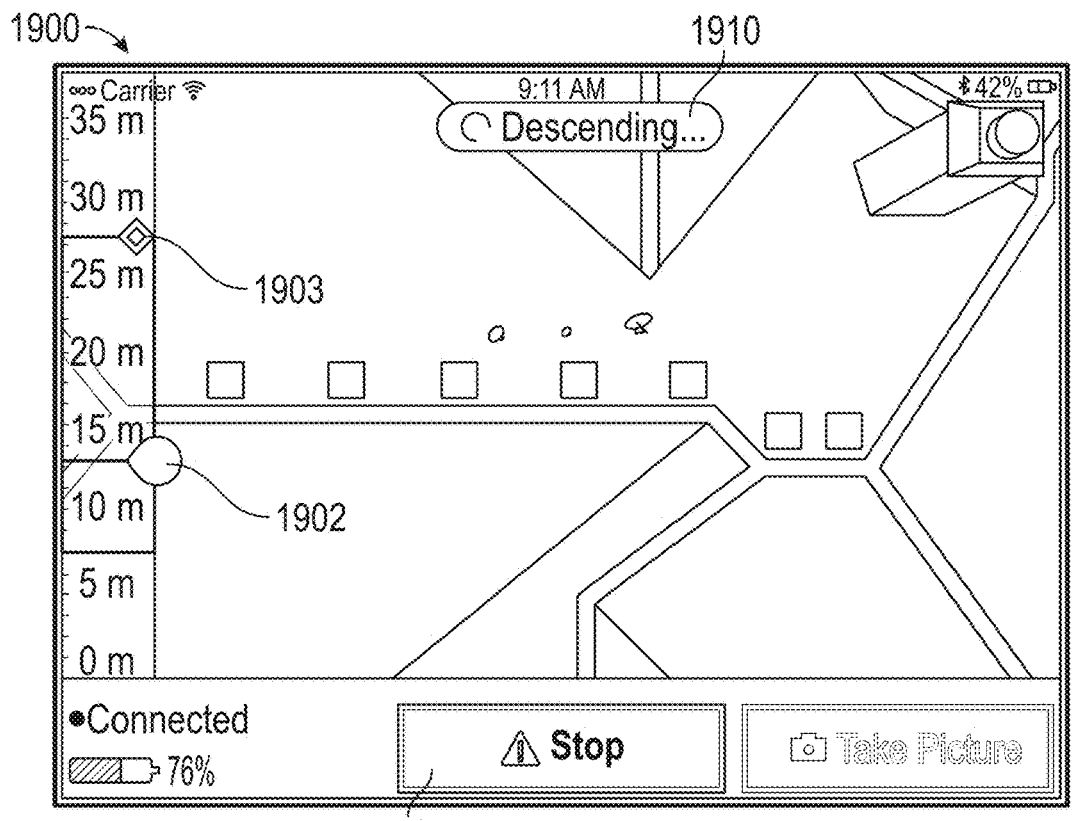
FIG. 19E illustrates an example user interface for control of an unmanned aerial vehicle.
Figure 19F:
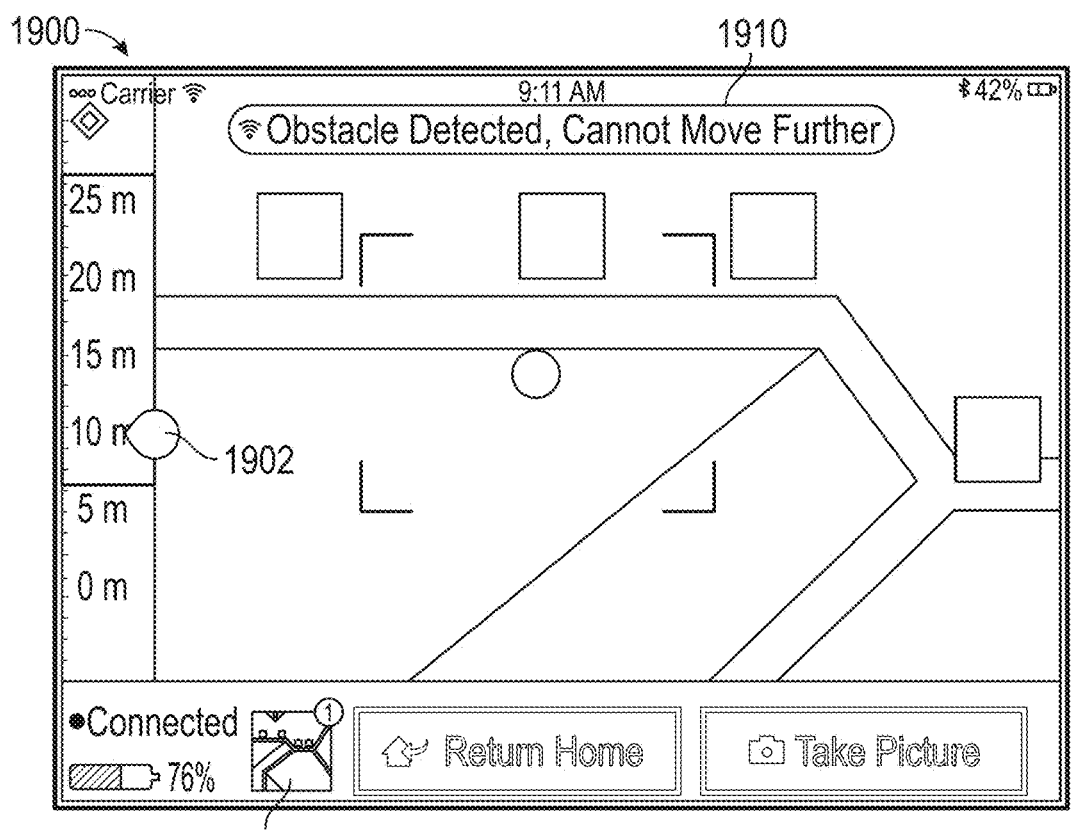
FIG. 19F illustrates an example user interface for control of an unmanned aerial vehicle.

In certain instances, when the UAV is instructed to navigate vertically toward the structure, an actual obstruction may not be observed by the UAV until the UAV is closer to a surface of the structure. Referring to FIGS. 19E and 19F, a user for example may drag the control 1902 down to a particular height/altitude. The UAV obstacle detection sensors may not register a surface of an obstacle until the UAV is closer to the obstacle. FIG. 19E illustrates a graphical user control 1905, or button, allow the user to stop the descent. This user control 1905 may be dynamically displayed when the UAV begins a descent. While the UAV is descending the altitude of the UAV as determined by the system may actually be incorrect for various reasons, for example, GPS satellite occlusion, multi-path errors, or GPS float. The dynamically displayed control allows the operator to observe UAV descending, and may stop the descent for any reason.

Additionally, the UAV may automatically stop the descent if an obstacle is observed. The distance from an obstacle in which the UAV will stop and hold, may be configured by the system. In FIG. 19E, the user interface displays via the informational banner 1910, that the UAV has detected an obstacle, and can not move further in the desired direction. While the example refers to a UAV descent, the UAV may automatically stop in a horizontal direction if the UAV detects an obstacle.

Operation of the control 1902 causes the UAV to vertically ascend or descend a predetermined rate, or a variable rate. The ascent or descent rate of the UAV may be either fixed or variable, and may be based on the altitude or distance from a structure. For example, the UAV may descend at a fixed rate of 0.1 meter/second, and may ascend at a fixed rate of 0.5 meter/second. The particular ascent and/or descent rate of the UAV may be configurable. Ideally, the rate of descent will be slower than the rate of ascent. In the case of inspecting a structure in close proximity, such as a rooftop, the system allows for fine control of the UAV while descending toward the rooftop by maintaining a slow descent speed of the UAV. Additionally, the descent rate or ascent rate may be variable based on the determined distance from the structure (as described above with regard to the user interface referred to in FIG. 17).

If no downward distance sensing equipment is available on the aircraft (e.g. sonar, stereo vision, lidar, etc.), then the intended altitude of the target point indicated is assumed to be the roof height. The system may provide a user interface to obtain a roof height value.

Using a known focal length of the imaging sensor producing the video frame as well as the physical dimensions of the sensor pixels of the UAV camera, a planar projection of the target point is made using the focal length relationship from the plane of the sensor (in pixel coordinates) to the plane of the roof (in physical coordinates). The projected coordinate of the target point on the plane of the roof is then sent as a waypoint to the UAV or flight controller subsystem. The distance from the sensor to the target point on the roof is calculated by taking the difference of the aircraft's measured altitude (usually a barometric altitude measurement) and the roof height. The plane of the sensor can be assumed to be parallel to the plane of the roof.

If downward distance sensing equipment is available on the aircraft (such as a sonar, stereo vision system, lidar ranging systems, etc.), the the same projection as above is made, except that the distance from the sensor to the target point is measured directly using the distance sensing equipment.

Vertical Control Touch Gestures

In addition to the vertical control, or in lieu of, the system may also use touch gestures to control the vertical ascent or descent of the UAV. The user interface may receive a pinch-in gesture (also referred to as zoom-in), and a pinch-out gesture (also referred to as zoom-out). The system recognizes the pinch gestures where two fingers are placed on the display, and the fingers are brought together (zoom-out), or are moved apart (zoom-in). In response to a received pinch-in/zoom-in gesture, the system will instruct the UAV to ascend to a higher altitude. In response to a received pinch-out/zoom-out gesture, the system will instruct the UAV to ascend to a lower altitude. The distance ascended or descended by the UAV is based on the size of the pinch. In other words, the physical distance moved by the fingers together or apart will cause the UAV to move a relative distance in height. The points of the contact at the display of the user interface may be measured, and the distance move the point moved and is evaluated to determine a distance to vertically move the UAV. While not shown in a figure, the user interface may display the distance the UAV will vertically move. For example, the system may display in the informational banner 1910 (described below) the particular distance the UAV will move based on the pinch gesture. In one embodiment, the UAV does not move until the user releases their fingers from the display. In another embodiment, the UAV is controlled in real-time, and the UAV responds directly to the pinch-in/pinch-out gesture. The imagery of the inspected area will adjust accordingly. In other words, as the UAV moves up, the camera observes a larger area, and as the UAV moves down, the camera observes a smaller area.

Also, the system may operate in a mode or be configured to use touch gestures to control the focal length of a camera affixed to the UAV. In this configuration, the pinch-in gesture will cause the camera lens to zoom out to a longer focal length. A received pinch-out gesture will cause the camera of the UAV to zoom-in to a shorter focal length. Alternatively, the gestures can be configured such that the pinch-in gesture UAV Horizontal User Interface Control To move the UAV in a horizontal direction, the user interface control 1902 is moved in any 360 degree direction in the user interface. The operator may for example, press and hold the control 1902. Optionally, the user interface may present the control 1902 in a different color, shading, or shape to indicate that the control has been selected. The operator touches with a finger, or a touch sensitive input device, and selects the control 1902. The control is moved or dragged to another position within the user interface. For example, as shown in FIG. 19B, the user may move the control 1902 over locations A, B or C. In response to the selection of the new location, the system will instruct the UAV to move to the new selected location. The new location may be referred to as the travel to location. The UAV will then maneuver to the travel to location. As the UAV moves to the travel to location, the user interface will display the imagery of the inspection area as the UAV moves to the new position. The selected travel to location will then become the center of the user interface. For example, if an operator moves the user interface control 1912 to position A, the UAV will horizontally traverse to position A. Then position A will become the center of the user interface since the UAV has physically maneuvered to position A. In one embodiment, the UAV will traverse at constant or near constant altitude from the original starting position to the selected position.

The system determines a distance that the control 1912 moves in the user interface. The system determines a number of pixels moved from a first point (e.g., center point of the control 1912 at its starting point) in the user interface to a second point (the travel to point) in the user interface. For example, the displayed imagery obtained from the UAV using an onboard camera, could be 1080p (1920×1080 pixels) images, or for example 720p (1280×720 pixels) images. Ideally, the images are displayed via the user interface as frames from a live video feed, or are still images taken by the UAV at successive time intervals. A number of pixels is determined from the first pixel location (starting point) to second pixel location (travel to point).

For example, an x/y axis may be applied to the video frame or still image, where starting point is (x,y=0,0). The travel to point, and its corresponding location can be a pixel in any of the four quadrants of the x/y axis (+x, +y), (−x, −y), (+x, −y), and (−x, −y). The particular heading can be determined as a degree, radians, etc. from the (+x, +y) axis by using the pixel coordinates for the starting point to the travel to point. A heading can then be determined by the system for the desired direction of travel for the UAV.

The system generates a flight command based on the travel to point, and the determined heading. A travel to geospatial location with a latitude/longitude and altitude value is calculated. The current altitude of the UAV is used for the altitude, and the latitude and longitude is based upon the heading and the computed pixel distance of the starting point to the travel to point.

The distance the UAV would actually move in a horizontal direction depends on the current altitude of the UAV. For example, moving the control 1912 the same distance via the user interface while the UAV is at different altitudes would cause the UAV to physically move different distances. If the operator selects the control 1912 and moves the control 1 inch to the right via the user interface, the horizontal distance the UAV physically moves would depends on the UAVs then-current altitude. The higher the altitude of the UAV, the farther the UAV will physically move horizontally for the same selected distance via the user interface.

Using a known focal length of the imaging sensor producing the video frame as well as the physical dimensions of the sensor pixels of the UAV camera, a planar projection of the target point is made using the focal length relationship from the plane of the sensor (in pixel coordinates) to the plane of the roof (in physical coordinates). The projected coordinate of the target point on the plane of the roof is then sent as a waypoint to the UAV or flight controller subsystem. The distance from the sensor to the target point on the roof is calculated by taking the difference of the aircraft's measured altitude (usually a barometric altitude measurement) and the roof height. The plane of the sensor can be assumed to be parallel to the plane of the roof.

UAV Slight Positional Adjustment

Using the system video processing capabilities, the targeted travel to point indicated in a live video frame may be used to derive image features (corners, edges, patterns, color gradations, etc.) from the area in the immediate vicinity of the travel to point (also referred to as a target waypoint). The system instructs the UAV to a geo-spatial location (i.e. target waypoint) as described above. As the UAV approaches the target waypoint, the system searches for the derived image features in the live video stream. If the features are detected in the video stream, the pixel locations of the derived features are used to determine more precisely how far the vehicle is from the intended target point in physical coordinates (using the above methods). The precise distance and direction of the vehicle from the target point is used to send successively more accurate waypoints to place the vehicle over the target point with increased accuracy.

The UAV may slightly adjust its position when arriving at or near the travel to point. The system may evaluate a sub-frame of pixels around the travel to point. For example, by moving the control 1912 to a new location via the interface, the system may capture a sub-frame of the image to be used as a later confirming image that the UAV is actually located over the desired travel to point. For example, an area of pixels (a 64×64 pixel square) around the travel to pixel may be selected or determined by the system. This area of pixels may be referred to as a first sub-frame of pixels. The size and shape of the first sub-frame of pixels may be varied, or adjusted according to the implementation.

Once the UAV navigates to the desired travel to geo-spatial location. The UAV obtains additional image(s), and selects or determines a second sub-frame of pixels. The second sub-frame of pixels would include the pixels in the center of the image. The UAV may slightly reposition its physical position by the system comparing the first sub-frame of pixels to second sub-frame of pixels, and moving the UAV so that the first sub-frame pixels, and the second sub-frame pixels align or match or correspond to one another, to a certain degree of confidence, or likelihood. The system may send one or more commands to the UAV to move the UAV slightly in a horizontal direction.

UAV Horizontal Movement Limitation

The system may be configured to limit horizontal movement of the UAV if the UAV is positioned below a particular altitude. The system may receive an input of a value indicating an altitude below which the UAV may not traverse horizontally. For example, an operator may select an altitude of 20 meters above the ground. So long as the UAV is at or above 20 meters above the ground, then the system will allow the movement of the UAV in a horizontal direction. Once the UAV navigates below this predetermined altitude, then the system may prevent operation of the control 1902. In one embodiment, the horizontal control may be inactivated and/or removed from the user interface, as illustrated in FIG. 19D. In FIG. 19D, the UAV is located at an altitude of 10 above the ground. Since the value was set at 20 meters, then the control would be inactivated in those situations where the UAV is positioned in space lower than 20 meters above the ground.

UAV Horizontal Speed

Similar to the ascent/descent rate of the UAV as discussed above. The horizontal speed of the UAV may be fixed or variable, and may be based on the altitude or distance from a structure. For example, while the UAV is at a lower altitude, the UAV may traverse horizontally at a fixed rate of 0.1 meter/second, and at a higher altitude may traverse horizontally at a rate of 0.5 meter/second. The particular horizontal traversal rate of the UAV may be configurable. Ideally, the horizontal rate of movement will be slower at a lower altitude, than the horizontal movement of the UAV at a higher altitude. Additionally, the horizontal rate of movement may be variable based on the determined distance from the surface of a structure (as described above with reference to the user interface of FIG. 17).

In certain situations, the UAV may be at a height or altitude in which traversal from the original location to the selected location at a constant altitude may not be possible. For example, assuming that the UAV is positioned over location A, and the system receives input to maneuver the UAV to location D, it is possible that depending on the altitude of the UAV, that the UAV may impact with the roof. In the example, if the UAV is very close to the roof, the steep may be at such a height the the UAV would collide with the roof. However, the system may determine that in the desired direction, there is an obstacle in the way of the UAV to get to the desired location. The system may be configured so that there is a safe altitude to which the UAV would vertically fly to and then traverse horizontally at the safe altitude to the selected location. For example, with obstacle avoidance sensors, or distance measuring sensors, the UAV system may detect a distance of the rooftop in the desired direction, or that they UAV may impact the rooftop in the desired direction. In response to detection of the rooftop in the desired direction, the system would instruct the UAV vertically increase the UAV altitude to a pre-set safe altitude, or at an altitude in which the UAV no longer detects the rooftop as an obstacle. The UAV would then fly to the selected location D, and the system may be configured to hold the UAV above the location D at the safe altitude, or may instruct the UAV to fly vertically downward toward the surface until the UAV is at a certain distance from the rooftop.

The interface also provides an informational banner 1910 about the status or state of the UAV. For example, when the UAV is hovering in position, the system may present text via the information banner such as "Waiting for command" so as to inform an operator of the system about the state of the UAV system. When the UAV is performing an action or a maneuver, the informational banner 1910 may display other text such as "descending" when the UAV is descending, "Ascending" when the UAV is ascending. This information is based on a maneuver of the UAV. The system may also present in the information banner, or other areas of the user interface, warnings or other status of the UAV. For example, when the UAV system detects an obstacle, the system may present informative text indicating an obstacle is detected, and the UAV cannot move any further in the selected direction.

Although in one embodiment, while the user interface is shown performing an aerial inspection with a Nadir, or downward view of a surface of an area, such as a rooftop, the system may also be used to perform vertical inspections.

While the UAV is holding over a position, the system allows for input via the user interface to instruct the UAV to obtain sensor information describing the inspection area. For example, the user interface 1900 may have a user interface control, such as the button 1904 to take a picture of the inspection area. As shown in FIG. 19A, the user interface may display a rectangular representation indication the frame of an image that will be taken by the UAV. This graphical user affordance informs the operator of the area of the displayed imagery that would be capture by a digital camera affixed to the UAV.

UAV Rotation

The interface 1900 may have a portion of the display 1908 that indicates the number of images that have been captured during an inspection. The display provides a graphical numeric counter to indicate the number of images captured. The counter is also referred to as a badge. Additionally, the user interface may display an animation showing a captured image shrinking from a larger size to a smaller size thumbnail, and being placed within the display area 1908.

Figure 19G:
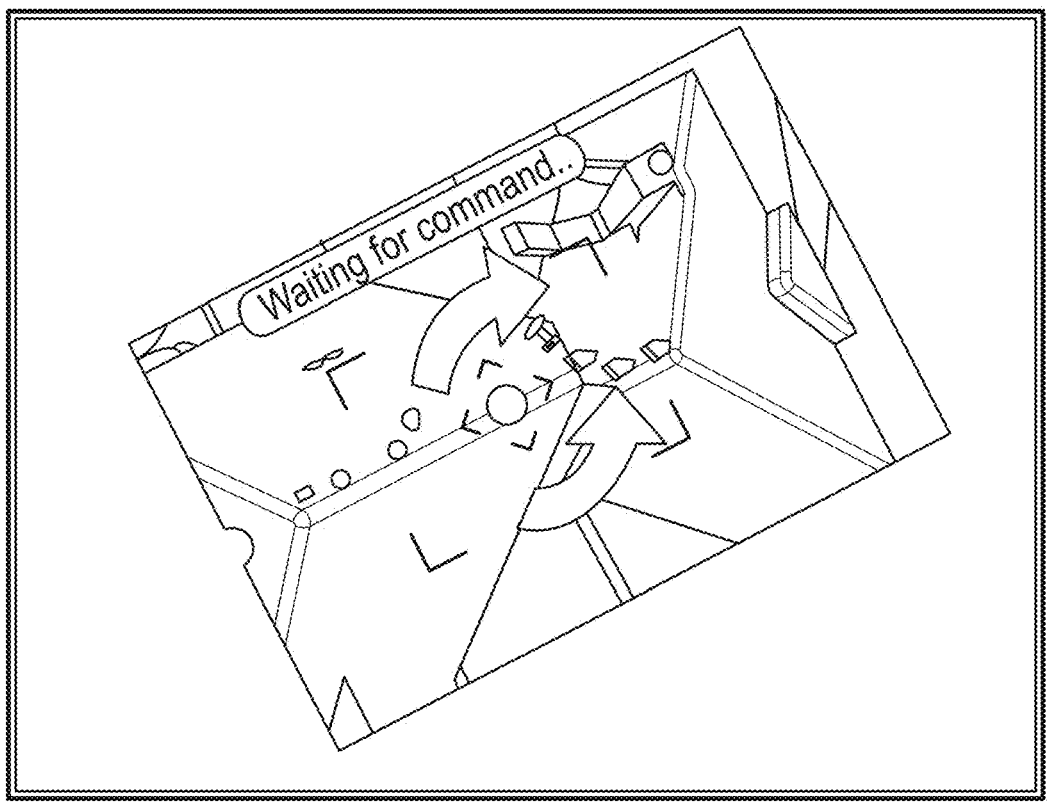
FIG. 19G illustrates an example user interface for control of an unmanned aerial vehicle.

The user interface allows for receipt of input to rotate the UAV, and change the orientation of the displayed imagery. Referring to FIG. 19G, in one embodiment to rotate the UAV, a rotate gesture is applied by the operator, and received by the user interface. A rotate gesture for example may be placing two or more fingers on the display, and rotating the fingers in an arc-wise, or circular fashion. In response to receipt of this gesture, the system with cause the UAV to horizontal rotate in the selected direction of rotation. The user interface may display orientation arrows in response to a user input of placing two fingers or more fingers onto the display of the device. As shown in FIG. 19G, the system may rotate and display the current frame of the image. The user would rotate the image to a new orientation. Alternatively, the display may continue to show a live video feed taken by the UAV camera. For example, in the depicted image a chimney is shown in the upper right corner. The user may rotate the image such that the chimney is at the left of the display. In response, the UAV would rotate its position to correspond to the rotate of the image. As an example, if the image is rotated 30 degrees clockwise, the system would instruct the UAV to also rotate 30 degrees around a z-axis. In other words, the UAV rotates 30 degrees to the right. Likewise, if the UAV is rotated 45 degrees counter-clockwise, the system would instruct the UAV to rotate 45 degrees around a z-axis. In other words, the UAV would 45 degrees to the left. When user interface no longer receives the user input (i.e., when the user removes their fingers from the display), the displayed images are now oriented in the new direction.

Haptic Feedback

When an obstacle is detected in a particular direction by the UAV system, the device may provide haptic feedback to the operator. For example, the device may buzz for a duration of time, or in a certain pattern to indicate that the UAV is nearing an obstacle. For example, the UAV system may detect that UAV is nearing the surface of the rooftop. The system may cause the device to vibrate or periodic vibrations depending on the proximity of the UAV to the detected obstacle. The intensity of the vibrations may increase the closer the UAV becomes to the obstacle.

UAV Movement to Multiple Locations

While not shown in a figure, the user interface may receive a gesture or input for a graphical control to designate a center or return point. For example, the UAV may be maneuvered to a particular location, and the user interface receive an input to designate that location as a return point. The system stores the geospatial location of the return point. This allows the operator to reposition the UAV to desired location.

Figure 20:
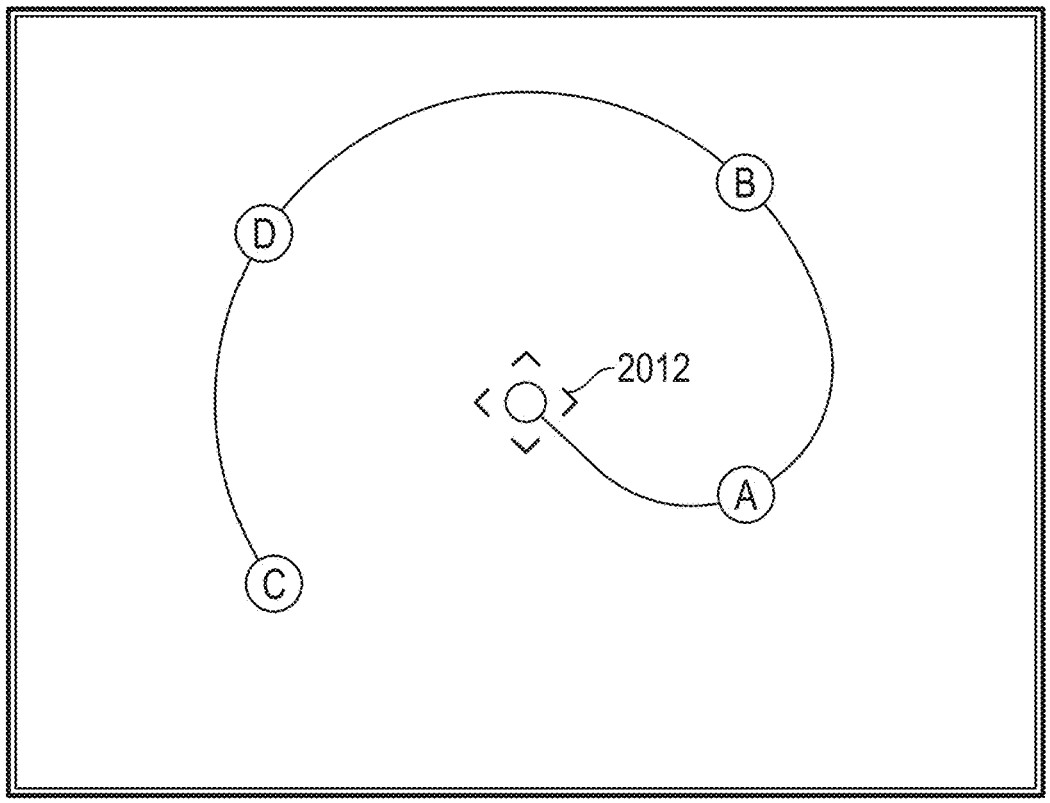
FIG. 20 illustrates an example user interface for selecting inspection locations above an inspection area.

Referring to FIG. 20, a figure is shown exemplifying a user selected path for the UAV to follow. In this example, the system receives an input selecting the horizontal control 2012 (also referred to as control 1912 in FIGS. 19B and 19C). The user interface receives a touch input on the horizontal control 2012. The control is moved to positions A, B, D and C while the users finger remains on the display of the device. To select a point for inspection, the user positions the control over and area, and holds in position temporarily. The position is then selected by the system as an inspection location. The user slides or moves the control 2012 to other positions that the user want to inspect. The user interface displays a graphical indication that the location is selected for inspection. After selecting the locations, and removing their finger, the UAV then proceeds to perform a detailed inspection of each of the selected locations where the UAV obtains sensor data describing the selected location.

In one embodiment, or mode of the user interface, the user may tap, or double tap areas on the displayed user interface for selections of locations that the UAV will travel to. In response to the received input, the system identifies the locations of the selected areas. The UAV may then perform an inspection of those locations based on the order of the input locations. Also, the system may be configured such that the system determines an optimal path to move from its then current position to the each of the selected inspection locations. The order in which the system determines which inspections location to navigate to may not necessarily be the same order as input by the user.

In one embodiment, or mode of the user interface, the user may initiate a recording mode, where the UAV will record, and store digital video while the UAV traverses from the starting point to the selected inspection points. When the UAV stops at the final inspection point, the UAV will stop recording video. Additionally, the system may be configured such that the UAV obtain periodic digital still images while traversing from the starting point to the selected inspection points.

Various types of UAVs may be used to implement the inventions described herein (for example, a fixed wing airplane, helicopter, a multi-rotor vehicle (e.g., a quadcopter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A flight system comprising:
    one or more processors comprising hardware;
    a memory storing instructions that, when executed by the one or more processors, cause the one or more processors to:
        receive multiple jobs, each job including a respective flight plan associated with a location for an aerial survey to be performed by an unmanned aerial vehicle (UAV);
        display, one or more jobs via a user interface, each job having an associated image of the location where the aerial survey is to be performed and a textual description of the job;
        receive, via the user interface, a selection of a job to be performed;
        analyze the associated image to determine a home location for the UAV;
        receive confirmation that pre-flight checks of the UAV have been performed;
        instruct the UAV to autonomously perform the aerial survey, the aerial survey comprising a flight pattern, wherein the flight pattern includes a path from the home location to a starting location, the starting location beginning a path where the UAV periodically obtains sensor information describing a property, land, or other structure;
        determine that a contingency event has occurred, the contingency event indicating a loss or degradation of a global positioning satellite (GPS) signal; and
        responsive to the contingency event, display, via the user interface, an indication of a physical location of the UAV and instruct the UAV to switch to manual control; or based on a resolution of the contingency event, instruct the UAV to autonomously land at the home location.

2. The flight system of claim 1, wherein the instructions, when executed by the one or more processors, cause the one or more processors to:
    determine a number of batteries needed for at least one job based on the respective flight plan; and
    display, via the user interface, an indication of the number of batteries needed for the at least one job.

3. The flight system of claim 1, wherein the instructions, when executed by the one or more processors, cause the one or more processors to:
    monitor a battery state or level while the UAV is performing the aerial survey;
    determine that the battery state or level has reached a threshold value; and
    responsive to a determination that the battery state or level has been reached, instruct the UAV to land at the home location.

4. The flight system of claim 1, wherein the instructions, when executed by the one or more processors, cause the one or more processors to:
    determine that a pop-up temporary flight restriction has occurred in the area of flight of the UAV; and
    instruct the UAV to land at the home location.

5. The flight system of claim 1, wherein the instructions, when executed by the one or more processors, cause the one or more processors to:
    determine a magnetic heading of the UAV indicating a front portion of the UAV; and
    when the UAV is instructed to return to the home location, rotate the UAV such that the front portion of the UAV is maintained toward the magnetic heading while the UAV returns to the home location.

6. The flight system of claim 1, wherein the instructions, when executed by the one or more processors, cause the one or more processors to:
    display, via the user interface, locations along the flight path where a battery change occurred.

7. The flight system of claim 1,
    wherein the soft controls are displayed only when the contingency event has occurred or is predicted to occur; and
    wherein the soft controls include user interface affordances, such as a button, icon, arrow, switch, stick controls, or other software controls, allowing directional flight controls to be sent to the UAV.

8. The flight system of claim 1, wherein the flight pattern includes waypoints, or periodic observations, where the UAV obtain sensor information, wherein the sensor information are multiple digital photographs taken at a given waypoint or at the given periodic observation at multiple focus values.

9. The flight system of claim 1, wherein the instructions, when executed by the one or more processors, cause the one or more processors to:
    determine the existence of an inflight compliance violation, where the violation occurs after launching the UAV, and the violation is a pop-up temporary flight restriction; and
    instruct the UAV to return to the home location, after determining the inflight compliance violation.

10. The flight system of claim 1, wherein the instructions, when executed by the one or more processors, cause the one or more processors to:
    display a listing of the jobs for those jobs in order of closest location proximity for the job and the location of the user device used to perform the job.

11. The flight system of claim 1, wherein the instructions, when executed by the one or more processors, cause the one or more processors to:
    obtain instructions via the user interface to land the UAV at the home location.

12. A method performed by one or more processors comprising hardware, the method comprising:
    receiving, one or more jobs, each job including a respective flight plan associated with a location for an aerial survey to be performed by an unmanned aerial vehicle (UAV);
    displaying, the one or more jobs via a user interface, each job having an associated image of the location where the aerial survey is to be performed and a textual description of the job;
    receiving, via the user interface, a selection of a job to be performed;
    determining a home location for the UAV;
    receiving confirmation that UAV pre-flight checks have been performed;
    instructing the UAV to perform the aerial survey, the aerial survey comprising a flight pattern, wherein the flight pattern includes a path from the home location to a starting location, the starting location beginning a path where the UAV periodically obtains sensor information describing a property, land, or other structure;

determining that a contingency event has occurred, the contingency event indicating a loss or degradation of a global positioning satellite (GPS) signal; and responsive to the contingency event, displaying, via the user interface, an indication of a physical location of the UAV and instructing the UAV to switch to manual control; or based on a resolution of the contingency event, instructing the UAV to autonomously land at the home location.

13. The method of claim 12, further comprising:
displaying, via the user interface, an indication of the battery life remaining for the UAV.

14. The method of claim 12, further comprising:
while the UAV is performing the aerial survey, monitoring a battery state or level;
determining that the battery state or level has reached a threshold value; and
responsive to a determination that the battery state or level has been reached, instructing the UAV to land at the home location.

15. The method of claim 12, further comprising:
determining that a pop-up temporary flight restriction has occurred in the area of flight of the UAV; and
instructing the UAV to land at the home location.

16. The method of claim 12, further comprising:
determining a magnetic heading of the UAV indicating a front portion of the UAV; and
when the UAV is instructed to return to the home location, rotate the UAV such that the front portion of the UAV is maintained toward the magnetic heading while the UAV returns to the home location.

17. The method of claim 12, further comprising:
displaying, via the user interface, locations along the flight path where a battery change occurred.

18. The method of claim 12, wherein the flight pattern includes waypoints, or periodic observations, where the UAV obtain sensor information, wherein the sensor information are multiple digital photographs taken at a given waypoint or at the given periodic observation at multiple focus values.

19. The method of claim 12, further comprising:
determining the existence of an inflight compliance violation, where the violation occurs after launching the UAV, and the violation is a pop-up temporary flight restriction; and
instructing the UAV to return to the home location, after determining the inflight compliance violation.

20. The method of claim 12, further comprising:
displaying a listing of the jobs for those jobs in order of closest location proximity for the job and the location of the user device used to perform the job.

21. A non-transitory computer storage medium storing instructions, that when executed by an unmanned aerial vehicle (UAV) comprising one or more processors, cause the UAV to perform operations comprising:
receiving, one or more jobs, each job including a respective flight plan associated with a location for an aerial survey to be performed by the UAV;
displaying, via a user interface, the one or more jobs in an order based on an estimated job completion time, each job having an associated image of the location where the aerial survey is to be performed and a textual description of the job;
receiving, via the user interface, a selection of a job to be performed;

determining a home location for the UAV;
receiving confirmation that UAV pre-flight checks have been performed;
instructing the UAV to perform the aerial survey, the aerial survey comprising a flight pattern, wherein the flight pattern includes a path from the home location to a starting location, the starting location beginning a path where the UAV periodically obtains sensor information describing a property, land, or other structure;
determining that a contingency event has occurred, the contingency event indicating a loss or degradation of a global positioning satellite (GPS) signal; and
responsive to the contingency event, displaying, via the user interface, an indication of a physical location of the UAV and instructing the UAV to switch to manual control; or based on a resolution of the contingency event, instructing the UAV to autonomously land at the home location.

22. The non-transitory computer storage medium of claim 21, wherein the operations further comprise:
displaying, via the user interface, an indication of the battery life remaining for the UAV.

23. The non-transitory computer storage medium of claim 21, wherein the operations further comprise:
while the UAV is performing the aerial survey, monitoring a battery state or level; and
determining that the battery state or level has reached a threshold value;
responsive to a determination that the battery state or level has been reached, instructing the UAV to land at the home location.

24. The non-transitory computer storage medium of claim 21, wherein the operations further comprise:
determining that a pop-up temporary flight restriction has occurred in the area of flight of the UAV; and
instructing the UAV to land at the home location.

25. The non-transitory computer storage medium of claim 21, wherein the operations further comprise:
determining a magnetic heading of the UAV indicating a front portion of the UAV; and
when the UAV is instructed to return to the home location, rotate the UAV such that the front portion of the UAV is maintained toward the magnetic heading while the UAV returns to the home location.

26. The non-transitory computer storage medium of claim 21, wherein the operations further comprise:
displaying, via the user interface, locations along the flight path where a battery change occurred.

27. The non-transitory computer storage medium of claim 21, wherein the flight pattern includes waypoints, or periodic observations, where the UAV obtain sensor information, wherein the sensor information are multiple digital photographs taken at a given waypoint or at the given periodic observation at multiple focus values.

28. The non-transitory computer storage medium of claim 21, wherein the operations further comprise:
determining the existence of an inflight compliance violation, where the violation occurs after launching the UAV, and the violation is a pop-up temporary flight restriction; and
instructing the UAV to return to the home location, after determining the inflight compliance violation.

29. The non-transitory computer storage medium of claim 21, wherein the operations further comprise:

displaying a listing of the jobs for those jobs in order of closest location proximity for the job and the location of the user device used to perform the job.

* * * * *